United States Patent
Kase et al.

(12)

(10) Patent No.: US 6,182,055 B1
(45) Date of Patent: Jan. 30, 2001

(54) COOPERATIVE INFERRING APPARATUS FOR CAUSING A PLURALITY OF INFERRING UNITS THAT INFER A PROBLEM TO NEGOTIATE WITH EACH OTHER CORRESPONDING TO NEGOTIATION STRATEGIES THAT CAN BE AUTONOMOUSLY CHANGED CORRESPONDING TO SUCH AS A NEGOTIATION HISTORY

(75) Inventors: Naoki Kase, Yokohama; Takahiro Kawamura, Tokyo, both of (JP)

(73) Assignee: Kabushiki Kaisha Toshiba, Kawasaki (JP)

( * ) Notice: Under 35 U.S.C. 154(b), the term of this patent shall be extended for 0 days.

(21) Appl. No.: 08/943,806

(22) Filed: Oct. 3, 1997

(30) Foreign Application Priority Data

Oct. 4, 1996 (JP) .................................................. 8-264007
Nov. 30, 1996 (JP) .................................................. 8-334560

(51) Int. Cl.$^7$ ...................................................... G06F 15/00
(52) U.S. Cl. .............................................. 706/10; 706/46
(58) Field of Search ........................................ 706/10, 46

(56) References Cited

U.S. PATENT DOCUMENTS 5,467,265 * 11/1995 Yamada .................................. 706/10
5,495,412 * 2/1996 Thiessen .................................. 705/1
5,890,145 3/1999 Kawamura ............................. 706/46

OTHER PUBLICATIONS

Reid G. Smith, IEEE Transactions on Computers, vol. C–29, No. 12, pp. 1104–1113, Dec. 1980, "The Contract Net Protocol: High–Level Communication and Control in a Distributed Problem Solver".

Gilad Zlotkin, et al., IEEE Transactions on Systems, Man, and Cybernetics, vol. 21, No. 6, pp. 1317–1324, Nov/Dec. 1991, "Cooperation and Conflict Resolution Via Negotiation Among Autonomous Agents in Noncooperative Domains".

* cited by examiner

*Primary Examiner*—Tariq R. Hafiz
*Assistant Examiner*—Edward G. Brown
(74) *Attorney, Agent, or Firm*—Oblon, Spivak, McClelland, Maier & Neustadt, P.C.

(57) ABSTRACT

In a negotiation performed among a plurality of inferring units that are mutually connected through a network, at any time of which a consistent inferred state is obtained, the inferred state is accepted by the units as a settled inferred state. Since each inferring unit can perform an inference based on the settled inferred state, the inference can be effectively performed. Particularly, when a negotiation is hierarchically performed (hierarchical negotiation) or when a plurality of negotiations are performed in parallel (multi-negotiation), each negotiation can be consistently effected. In addition, in a negotiating process, each inferring unit negotiates with other inferring units using negotiation strategies having a standpoint of priority (role) and tolerance (transaction) of a request in the negotiation. In addition, each inferring unit autonomously changes the negotiation strategies for use corresponding to the negotiation history, the current internal state, and the current external state. Thus, proper negotiation strategies can be used for a complicated problem. Consequently, a negotiation can be easily effected.

17 Claims, 25 Drawing Sheets

INFERRING UNIT A

INFERRING UNIT B

INFERRING UNIT C

| STANDPOINT OF CATEGORIZATION | | ROLE | | |
|---|---|---|---|---|
| | | UPPER | EQUAL | LOWER |
| TRANSACTION | MINIMUM | IN THE CASE THAT LOCAL SCHEDULER HAS RECEIVED TWO OR MORE REPLIES THAT REPRESENT REJECTION FROM ONE NEGOTIATING PARTY | | IN THE CASE THAT LOCAL SCHEDULER HAS SENT TWO OR MORE REPLIES THAT REPRESENT REJECTION TO ONE NEGOTIATING PARTY |
| | TOLERANCE | | INITIAL STATE | |

FIG. 17

COOPERATIVE INFERRING APPARATUS FOR CAUSING A PLURALITY OF INFERRING UNITS THAT INFER A PROBLEM TO NEGOTIATE WITH EACH OTHER CORRESPONDING TO NEGOTIATION STRATEGIES THAT CAN BE AUTONOMOUSLY CHANGED CORRESPONDING TO SUCH AS A NEGOTIATION HISTORY

BACKGROUND OF THE INVENTION

1. Field of the Invention

The present invention relates to a cooperative inferring apparatus for causing a plurality of agents or a plurality of inferring agents to perform an inference in cooperation or in parallel so as to solve a problem, a cooperative inferring method thereof, a record medium recording a program thereof, and a cooperative inferring system thereof.

2. Description of the Related Art

As computer network technologies have advanced, computer systems have been changed from centralized systems of which host computers perform all processes thereof to distributed systems of which a plurality of computers that are connected through a network perform respective processes.

In a problem solving method using an artificial intelligence technology of which a problem is solved by causing a computer to imitate a problem solving process of humans, a distributed problem solving method that uses a plurality of inferring units rather than a centralized problem solving method for causing one inferring unit to perform all processes has been proposed.

In the distributed problem solving method, each inferring unit assigns an individual problem solving criterion and infers a process thereof. However, since inferred results of individual inferring units may contradict each other or a problem cannot be solved without a cooperation of other inferring units, it is preferred to cause information to be exchanged among inferring units so that the respective processes are corrected and consistently performed.

The process for exchanging information is referred to as negotiation. So far, a variety of negotiation protocols such as contract net protocol and integrated negotiation protocol have been proposed.

The contract net protocol imitates the principles of a market and proposes the process for exchanging information for assigning a task. In this case, a problem that takes place in a problem solving process and that cannot be solved by one inferring unit and a problem that can be effectively solved by another inferring are referred to as task. When an inferring unit that has a task publicizes it (this inferring unit is referred to as manager), the other inferring units (they are referred to as contractors) infer whether or not to contract with the manager to execute the task depending on their situations. When a contractor is in a situation of which it can contact with the manager for the task, it tenders for the task. Any inferring unit becomes a manager when it publicizes a task.

When a contractor tenders for a publicized task, it attaches the cost thereof. In reality, the cost is for example the current load of the contractor and the amount of time to perform the task. The publicized inferring unit compares conditions of individual contractors and accepts the bid of an inferring unit that has tendered for the task with the optimum condition. For example, when several inferring units cooperatively schedule jobs, they can transfer jobs that they cannot assign them in their time tables as tasks to other inferring units.

For details of the contract net protocol, refer to "The Contract Net Protocol: High-Level Communication and Control in a Distributed Problem Solver", by R. G. Smith, IEEE Transactions on Computers, Vol. 29, No. 12, pp. 1104–1113, 1980.

Next, the integrated negotiation protocol will be described. In the integrated negotiation protocol, each inferring unit operates so that the effect (profit) of each inferring unit becomes maximum (namely, economical rationality), thereby obtaining inconsistent states of inferring units and an agreement of the possibility of cooperation thereof.

In the integrated negotiation protocol, individual inferring units make plans (compromise plans) corresponding to their circumstances. Thus, a joint plan of which each plan is combined is obtained. In addition, the cost of each plan of the joint plan is calculated. A set of compromise plans (a set of negotiations) of which the effect is maximum for each inferring unit is obtained.

In this case, an example of a compromise plan is an alternative of a schedule adjustment of a meeting (such as "day 3", "day 4", and "day 7"). A set of negotiations is a set of compromise plans. Examples of set of negotiations are "days 3 and 4" and "days 4 and 7".

A compromise plan is designated "effect" as an evaluated value. When "day 3" is more convenient than "day 7", the relation of [effect of "day 3"]>[effect of "day 7"] is satisfied.

With the set of negotiations, a conflicting state, a compromising state, and a cooperating state are defined. Each unit adopts the most profitable compromise plan as a plan. In other words, the "cooperating state" represents that there is of a compromise plan that both units can profitably accept. For example, a negotiation between a selling party and a buying party is effected at the initially presented price. The "compromising state" represents that there is a compromise plan that is not the best, but better than the current state. For example, in the case that the selling party slightly reduces the price of a sales item from the initially presented price, the effect is larger than the case that it is stocked. In this case, the action of which the selling party sells the sales item at a reduced price is a "compromise plan".

The "conflicting" state represents the case that there is no compromise plan and thereby a negotiation is not effected. In the case of the "conflicting state", a probability selecting means such as a dice or a lot is used to determine which of the parties is lost (mixed joint plan) and thereby rationally perform the negotiation. This is because when an agreement is not obtained, the problem is not solved and thereby the entire problem of the inference cannot be solved. Since the negotiation is probabilistically effected, one party is not continuously lost. Thus, a better result than the state that the negotiation is not effected is obtained. Consequently, negotiations in all the cooperating state, the compromising state, and the conflicting state can be performed.

In such a precondition, a local inferring unit publicizes compromise plans in the order of higher effect and agrees with the negotiating unit when a compromise plan of the negotiating unit has higher effect than one of compromise plans of the local inferring unit.

For details of the integrated negotiation protocol, refer to "Cooperation and Conflict Resolution via Negotiation Among Autonomous Agents in Non-Cooperative Domain", by G. Zlotkin and J. S. Rosenschein, IEEE Transaction on Systems, Man, and Cybernetics, Vol. 21, No. 6, pp. 1317–1324, 1991.

In the above-described related art references, it is expected that various proposals made between units allow them to be consistent. In addition, each unit performs an inference with an unspoken agreement that the latest inferred state that has been obtained through negotiations is the best way.

However, since each unit does not know the inside of other units, if a negotiation has reached a deadlock with a particular compromise plan, the content of the existing negotiation as the precondition for inferring the compromise plan may be overruled. In this case, since each unit loses the basis of the inference, each unit should retry the inference. Thus, the inference cannot be effectively performed. Particularly, in the conventional inference, assuming that various selectable options in the inferring process are branches of a tree chart, depth priority searching is performed. However, whenever a branch close to the root is overruled, the inference should be retried.

In addition, when an inference is performed with a precondition of the latest negotiating state, the range of the solution becomes narrow and thereby the probability of which the precondition is overruled becomes high. Thus, with the content of a negotiation that just precedes the latest negotiation, a better solution may be obtained. However, it is difficult to assign a criterion that represents which content of the negotiation is proper. Moreover, when an inference is retried because the preceding inference has reached a deadlock, it is not clear to distinguish substantial proposals and processes from settled agreements. Thus, since it is not clear to backtrack for the inference, the process was troublesome.

Furthermore, in the conventional negotiation protocol, since information exchange necessary for a negotiating process is mixed with information exchange used for a real negotiation, when the negotiation protocol is applied to a real problem, it is difficult to install the conventional negotiation protocol to an inferring unit. In other words, when the conventional negotiation protocol is installed to an inferring unit, a procedural process with respect to a negotiation framework such as "'start/end of a negotiation and an identification of an item to be negotiated" and a substantial process such as practical conditions of quantity and amount of money for example "quantity is 20/amount of money is 1500 yen".

SUMMARY OF THE INVENTION

The present invention is made from the above-described point of view.

A first object of the present invention is to provide a cooperative inferring apparatus for clarifying a basis of a negotiation and thereby performing an inference with excellent efficiency, a cooperative inferring method thereof, a cooperative inferring system thereof, and a record medium that records a program thereof.

A second object of the present invention is to provide a cooperative inferring apparatus for accomplishing a change of a restriction that cannot be solved by a single inferring unit through effective negotiations and thereby creating a solution (such as a production schedule) that is consistent in the system, a cooperative inferring method thereof, a cooperative inferring system thereof, and a record medium that records a program thereof.

A third object of the present invention is to provide a cooperative inferring apparatus for allowing a consistent state before a negotiation to be easily restored even if an inconsistent state takes place as a result of an inference through negotiations, a cooperative inferring method thereof, a cooperative inferring system thereof, and a record medium that records a program thereof.

A fourth object of the present invention is to provide a cooperative inferring apparatus for accumulating agreements that have been inferred through negotiations step by step and repeating the negotiations, thereby effectively performing an inference for solving a complicated problem, a cooperative inferring method thereof, a cooperative inferring system thereof, and a record medium that records a program thereof.

A fifth object of the present invention is to provide a cooperative inferring apparatus for executing a plurality of negotiations in parallel and thereby further improving inference efficiency with an agreement achieved in relatively short time, a cooperative inferring method thereof, a cooperative inferring system thereof, and a record medium that records a program thereof.

A sixth object of the present invention is to provide a cooperative inferring apparatus for hierarchically performing negotiations and thereby easily reusing and modifying the negotiations, a cooperative inferring method thereof, a cooperative inferring system thereof, and a record medium that records a program thereof.

A seventh object of the present invention is to provide a cooperative inferring apparatus for changing negotiation strategies corresponding to a problem to be solved and thereby easily effecting a negotiation, a cooperative inferring method thereof, a cooperative inferring system thereof, and a record medium that records a program thereof.

An eighth object of the present invention is to provide a cooperative inferring apparatus for improving the efficiency of solving a problem, a cooperative inferring method thereof, a cooperative inferring system thereof, and a record medium that records a program thereof.

A first aspect of the present invention is a cooperative inferring apparatus, comprising a means for inferring a solution alternative for solving a particular problem, an inferring means for inferring a new problem of which a new condition is added to the particular problem corresponding to the solution alternative, a negotiating means for obtaining information necessary for solving the new problem from another unit through a negotiation, a means for inferring a solution of the new problem corresponding to the information obtained by the inferring means and the information obtained by the negotiating means so as to obtain a solution alternative, and a means for determining whether or not the solution alternative is agreed by the other unit and treating the solution alternative as a solution when the solution alternative has been agreed by the other unit.

A second aspect of the present invention is a cooperative inferring apparatus, comprising a means for inferring a solution alternative for solving a particular problem, an inferring means for inferring a new problem of which a new condition is added to the particular problem corresponding to the solution alternative, a negotiating means for obtaining information necessary for solving the new problem from another unit through a negotiation, and a means for inferring a solution of the new problem corresponding to the information obtained by the inferring means and the information obtained by the negotiating means so as to obtain a solution alternative, wherein a negotiation with the other unit is performed corresponding to negotiation strategies that are assigned corresponding to the new problem and that can be changed corresponding to a negotiation stage.

A third aspect of the present invention is a cooperative inferring method for solving a particular problem by one of a plurality of inferring units that communicate with each other, the method comprising the steps of (a) inferring a solution alternative for solving a particular problem, (b) inferring a new problem of which a new condition is added to the particular problem corresponding to the solution alternative, (c) obtaining information necessary for solving the new problem from another unit through a negotiation, (d) inferring a solution of the new problem corresponding to the information obtained by the step (b) and the information obtained by the step (c) so as to obtain a solution alternative, and (e) determining whether or not the solution alternative is agreed by the other unit and treating the solution alternative as a solution when the solution alternative has been agreed by the other unit.

A forth aspect of the present invention is a cooperative inferring method, comprising the steps of (a) inferring a solution alternative for solving a particular problem, (b) inferring a new problem of which a new condition is added to the particular problem corresponding to the solution alternative, (c) obtaining information necessary for solving the new problem from another unit through a negotiation, and (d) inferring a solution of the new problem corresponding to the information obtained by the step (b) and the information obtained by the step (c) so as to obtain a solution alternative, wherein a negotiation with the other unit is performed corresponding to negotiation strategies that are assigned corresponding to the new problem and that can be changed corresponding to a negotiation stage.

A fifth aspect of the present invention is a record medium that records a program that causes a computer to perform the functions of (a) inferring a solution alternative for solving a particular problem, (b) inferring a new problem of which a new condition is added to the particular problem corresponding to the solution alternative, (c) obtaining information necessary for solving the new problem from another unit through a negotiation, (d) inferring a solution of the new problem corresponding to the information obtained by the function (b) and the information obtained by the function (c) so as to obtain a solution alternative, and (e) means for determining whether or not the solution alternative is agreed by the other unit, treating the solution alternative as a solution when the solution alternative has been agreed by the other unit, and discarding the solution alternative when the solution alternative has not been agreed.

A sixth aspect of the present invention is a cooperative inferring apparatus for solving a particular problem by a plurality of inferring units that communicate with each other, each of the inferring units comprising a means for inferring a solution alternative for solving a particular problem, an inferring means for inferring a new problem of which a new condition is added to the particular problem corresponding to the solution alternative, a negotiating means for obtaining information necessary for solving the new problem from another unit through a negotiation, a means for inferring a solution of the new problem corresponding to the information obtained by the inferring means and the information obtained by the negotiating means so as to obtain a solution alternative, and a means for determining whether or not the solution alternative is agreed by the other unit and treating the solution alternative as a solution when the solution alternative has been agreed by the other unit.

A seventh aspect of the present invention is a cooperative inferring system for solving a particular problem by a plurality of inferring units that communicate with each other, each of the inferring units comprising means for inferring a solution alternative for solving a particular problem, inferring means for inferring a new problem of which a new condition is added to the particular problem corresponding to the alternative solution, negotiating means for obtaining information necessary for solving the new problem from other unit through a negotiation, means for inferring a solution of the new problem corresponding to the information obtained by said inferring means and the information obtained by said negotiating means so as to obtain a alternative solution, and means for determining whether or not the alternative solution is agreed by the other unit and treating the alternative solution as a solution when the alternative solution has been agreed by the other unit.

According to the present invention, in a process of which a problem that cannot be solved by a local inferring unit is solved by negotiating with another inferring unit, an agreed inferred state is used for a basis of the subsequent inference as a settled inferred state. An inferred state that has not been agreed is discarded. Thus, when an inference is retried, an inferred state to be tracked back becomes clear. Thus, an inference can be effectively performed.

According to the present invention, in a process of which a local inferring unit performs a proposal for solving a problem to another inferring unit, an agreed inferred state is used for a basis of the subsequent inference as a settled inferred state. An inferred state that has not been agreed is discarded. Thus, when an inference is retried, an inferred state to be traced back becomes clear. Consequently, an inference can be effectively performed.

According to the present invention, a settled inferred state is sent to another unit. Thus, the latest inferred state is consistent among units that perform cooperative inferences. As a result, an inference can be adequately and quickly performed.

According to the present invention, since a solution that has been obtained at first in a plurality of negotiations performed in parallel can be used as a basis of the subsequent inference. As a result, the inferring speed can be improved.

According to the present invention, since each means of each inferring unit is composed of a plurality of modules and each module is categorized as layers having common properties, a variety of inferring units can be structured corresponding to problems to be solved by changing only a module of a relevant layer.

According to the present invention, since a negotiation is performed corresponding to both a problem to be solved and negotiation strategies that can be changed corresponding to a negotiating state with another unit, the negotiation can be easily effected.

According to the present invention, a cooperative inferring unit negotiates with anther unit corresponding to both a problem to be solved and negotiation strategies that can be changed in a negotiating state with another unit. An agreed inferred state is used for a basis of the subsequent inference as a settled inferred state. An inferred state that has not been agreed is discarded. Thus, the negotiation can be easily effected. In addition, when the inference is retried, an inference stage to be traced back becomes clear. Thus, the inference can be effectively performed.

According to the present invention, since a negotiation history is reflected to the negotiation strategies, the negotiation can be effected corresponding to both the problem and the situation.

According to the present invention, when a reply received from another unit is negative in the negotiating state, since the negotiation strategies can be adaptively changed, a negotiation for a complicated problem can be easily settled.

According to the present invention, since the present invention can be applied to a scheduling problem, a problem such as a production schedule and so forth can be quickly solved.

According to the present invention, in a process of which a problem is solved through negotiations performed among a plurality of cooperative inferring units connected through a network, an agreed inferred state is used for a basis of the subsequent inference as a settled inferred state. An inferred state that has not been agreed is discarded. Thus, the efficiency for solving a problem by the entire network can be effectively performed.

These and other objects, features and advantages of the present invention will become more apparent in light of the following detailed description of best mode embodiments thereof, as illustrated in the accompanying drawings.

BRIEF DESCRIPTION OF DRAWINGS

FIG. 17 is a table showing the state that individual negotiation strategies are categorized according to an embodiment of the present invention;

DESCRIPTION OF PREFERRED EMBODIMENTS

Next, with reference to the accompanying drawings, embodiments of the present invention will be described.

(1) Structure of First Embodiment (1-1) Outline of First Embodiment

The first embodiment of the present invention is a scheduling system that makes a production schedule.

The scheduling system is a system that assigns given jobs to resources corresponding to resource information that has been input. The resource information is information of various resources used for processing the jobs. For example, the resource information is data such as "there are two milling machines and one drilling machine" or "Two workers can be prepared". A job is data of a production step such as "first step for producing a product A: Abrade the surface. (amount of work: two hours)" or "second step for producing a product A: Make a hole with the drilling machine (amount of work: one hour)". The scheduling system considers idle states of resources and, determines what product to produce with what resource in what time, and finally assigns the resources to all jobs so as to solve a problem.

A collection of resources is referred to as a shop. A production schedule is not completed with each job. Thus, a plurality of shops should be used in a predetermined sequence depending on a job. In other words, each production schedule has various restrictions such as the order of shops or jobs. Thus, considering the deadline of a shop that is in charge of the preceding step, the current step should be scheduled. Among inferring units that are in charge of a plurality of shops, a schedule is made corresponding to the mutual relation thereof. In the above-described example, the "milling machine" and "drilling machine" are shops.

In the distributed cooperative scheduling system according to the first embodiment, a plurality of inferring units that make a production schedule of a single shop are used. By mutually connecting these inferring units, considering the mutual relations, a consistent production schedule is made.

(1-2) Overall Structure

Figure 1:
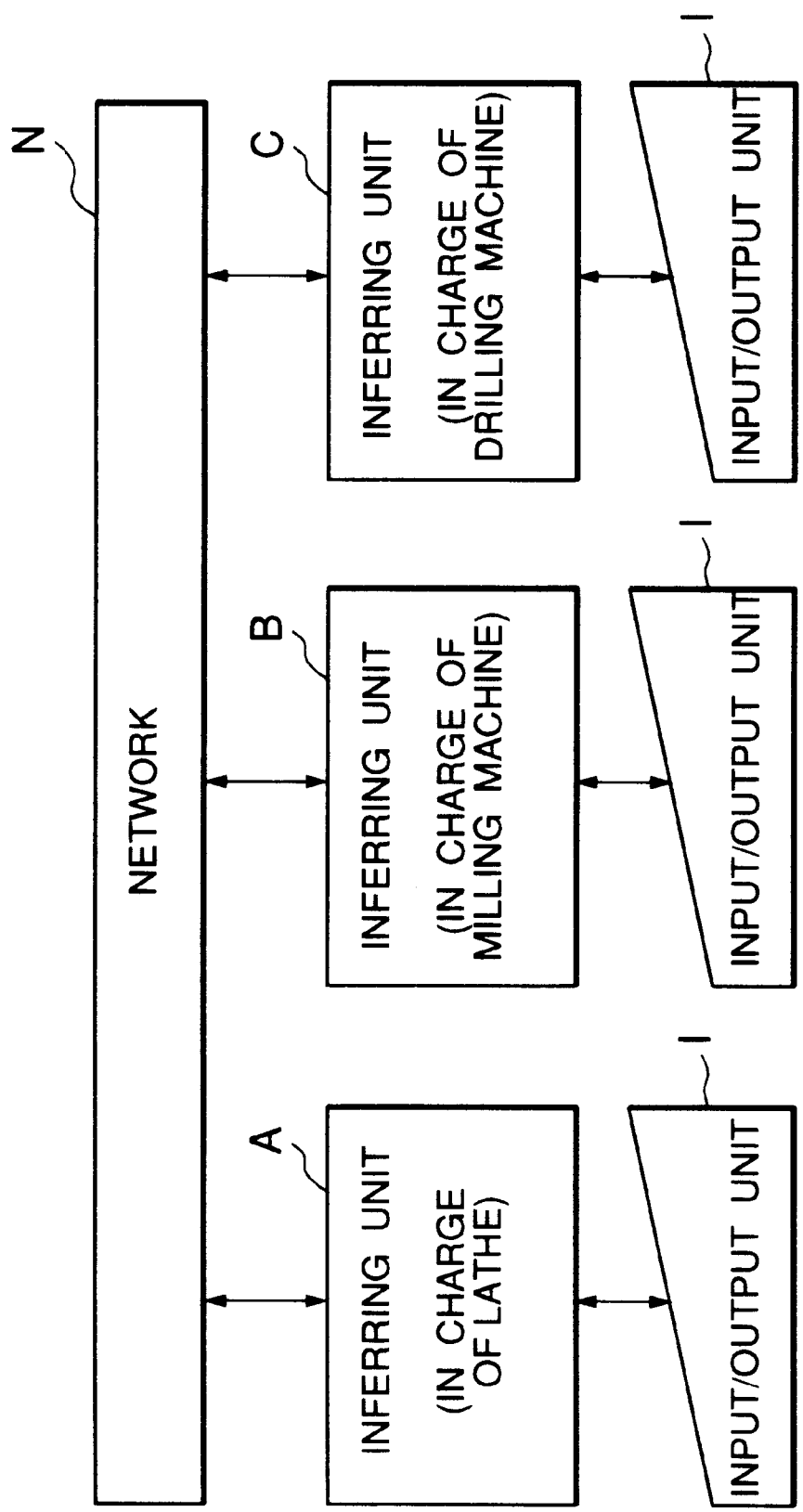
FIG. 1 is a functional block diagram showing an overall structure of a scheduling system according to an embodiment of the present invention.

FIG. 1 is a functional block diagram showing the overall structure of the scheduling system. Referring to FIG. 1, in the scheduling system, a plurality of inferring units A, B, and C that mutually negotiate with each other and solve a problem are mutually connected through a network N. Each of the inferring units A, B, and C has an input/output unit I. Examples of the input/output unit I are input units such as a keyboard and a mouse and an output unit such as a video display. However, the input/output unit I is not limited to such units. In other words, another unit can be used as long as it can input/output particular data. In the inferring units A, B, and C, when resource information and jobs are input as a problem from the input unit, a production schedule is inferred and made. The inferred schedule is supplied from the output unit.

In the embodiment, the inferring unit A, the inferring unit B, and the inferring unit C are in charge of production schedules of the shop of one lathe machine, the shop of one milling machine, and the shop of one balling machine, respectively.

(1-3) Inferring Units

Figure 2:
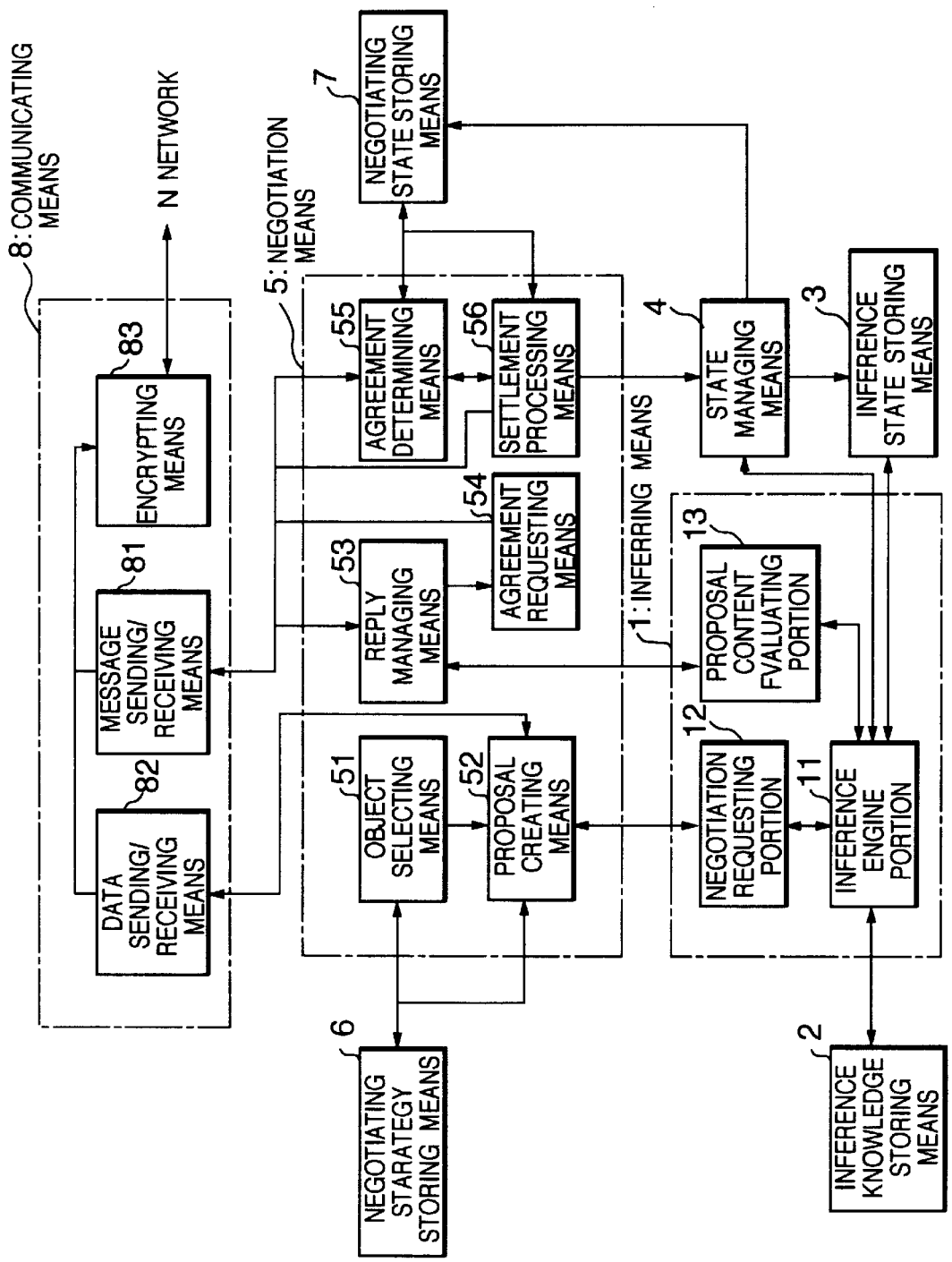
FIG. 2 is a functional block diagram showing an inferring unit according to an embodiment of the present invention.

FIG. 2 is a functional block diagram showing the structure of each of the inferring units A, B, and C. Referring to FIG. 2, in the embodiment, each inferring unit is mainly composed of an inferring means 1, a negotiating means 5, and a communicating means 8.

(1-3-1) Inferring Means

1t Each of the inferring units A, B, and C has the inferring means 1. The inferring means 1 infers a problem of each shop, the problem being input from the input/output unit I connected to each unit corresponding to inference knowledge that has been stored in an inference knowledge storing means 2 and then obtains a particular solution. The inference knowledge is a rule for the assignment of jobs to resources, an assumption generating rule for the change of restrictions of jobs and resources that are input, a rule for the depth of an inference in the case that selectable options are represented by a tree chart, and the priority in the case that there are a plurality of solutions that satisfy a problem.

The inferring means 1 comprises an inference driving portion (inference engine) 11, a negotiation requesting portion 12, and a proposal content evaluating portion 13. The inference driving portion 11 infers a problem that is received from the input/output unit I and another inferring unit corresponding to the inference knowledge. When the local inferring unit cannot solve the problem as the inferred result of the inference driving portion 11, the negotiation requesting portion 12 requests a negotiating means 5 (that will be described later) to negotiate with another inferring unit. When an inference is performed corresponding to the content of a proposal received from another unit through the negotiating means 5, the proposal content evaluating portion 13 determines whether or not a solution that satisfies the content of the proposal has been obtained and informs the negotiating means 5 of the determined result.

A solution obtained in the inferring process by the inferring means 1 (and a solution obtained as the inferred result) is supplied as an inferred state from the input/output unit I. In addition, the solution is stored in an inferred state storing means 3. The inferred state storing means 3 stores the following solutions as an inferred state.

(a) A solution of each inferring unit obtained by inferring a problem received from the input/output unit I. This solution is a solution before a negotiation is started. The solution is solved in the local inferring unit.

(b) A solution obtained in a negotiating process with another inferring unit. This solution is for example a solution inferred by the local unit corresponding to a proposal to another unit or a solution inferred corresponding to a proposal of another unit.

(c) A solution of a settled inferred state obtained as a result of a negotiation with another inferring unit.

A plurality of solutions may be obtained at a time. For example, in a negotiating process of a problem to each shop, a plurality of solutions that satisfy a problem and a negotiation condition may exist. In this case, a plurality of solutions are stored. At this point, the priority of the solutions is assigned corresponding to the above-described inference knowledge.

Each inferred state (solution) stored in the inferred state storing means 3 is managed by a state (context) managing means 4. The state managing means 4 manages the writing/reading operations of each inferred state to the inferred state storing means 3 corresponding to a command received from the inferring means 1 and the negotiating means 5 (that will be described later in detail). The state managing means 4 determines what inferred state the inferring means 1 uses in the inferring process and the negotiating process.

(1-3-2) Negotiating Means

Each of the inferring units A, B, and C has the above-mentioned negotiating means 5 that negotiates with other inferring units and obtains a solution that is consistent among each unit.

The negotiating means 5 is connected to a negotiation strategy storing means 6 that stores negotiation strategies for negotiations. Examples of negotiation strategies stored in the negotiation strategy storing means 6 are as follows. In the case of a lathe, "a job that has been assigned should not be unnecessarily moved". In the case of a milling machine, "a problem should be solved by the local unit as much as possible rather than requesting another unit". In the case of a drilling machine, "a request should be accepted as much as possible". The lathe, milling machine, and drilling machine may have a common strategy such as "a negotiation should be performed so that the other jobs are not adversely affected". The inferring means 1 uses the negotiation strategies along with the above-described inference knowledge to perform an inference when it creates a proposal or a reply to a proposal of another unit.

The negotiating means 5 performs a negotiation while exchanging data necessary to create a proposal and a reply with the inferring means 1. The negotiating means 5 comprises an object selecting means 51, a proposal creating means 52, and a reply managing means 53. The object selecting means 51 selects an operation time of a job as a negotiation object corresponding to the negotiation strategies. The proposal creating means 52 causes the inferring means 1 to infer a proposal to another unit corresponding to the job and operation time as the selected object. The reply managing means 53 causes the inferring means 1 to evaluate a proposal received from another unit and infer whether the proposal is adequate. The reply managing means 53 receives a reply against a proposal from an inferring unit as the negotiating party. The negotiating means 5 further comprises an agreement requesting means 54, an agreement determining means 55, and a settlement processing means 56. The agreement requesting means 54 asks another unit to agree with a proposal corresponding to the content of a reply received by the reply managing means 53. The agreement determining means 55 determines whether or not to agree with an agreement request received from another unit. The settlement processing means 56 determines whether or not an agreement signal has been received from another inferring unit and causes the state managing means 4 to store the agreed inferred state as a settled inferred state in the inferred state storing means 3.

The negotiating means 5 is connected to a negotiating state storing means 7 that stores an inferred state and other data that are required in a negotiating process. In other words, the negotiating state includes an inferred state obtained as a negotiation object from the inferred state storing means 3, an inferred state proposed to another unit in a negotiating process, a reply to a proposal of another unit, and the content of a reply to an agreement request. The negotiating state storing means 7 is connected to the state managing means 4. The negotiating state storing means 7 causes the state managing means 4 to store an inferred state in a negotiating process stored in the negotiating state storing means 7 as a settled inferred state to the inferred state storing means 3 corresponding to a command received from the settlement processing means 56.

(1-3-3) Communicating Means

Each of the inferring units A, B, and C has a communicating means 8 that communicate with other unit through a network N. The communicating means 8 comprises a message sending/receiving means 81 and a data sending/receiving means 82. The message sending/receiving means 81 explicitly forms an agreement with other unit using messages such as a negotiation start message, an agreement start message, an acceptance message, a settlement message, and a negotiation cancellation message. The data sending/receiving means 82 sends and receives a proposal and a re-proposal in a negotiating stage. The message sending/receiving means 81 is connected to an encrypting means 83. When a message to be sent and received includes confidential data such as the amount of money, the encrypting means 83 encrypts the message.

(2) Operation of First Embodiment

In the first embodiment, an inference (scheduling) is performed as follows.

(2-1) Content of Job

To perform scheduling with the present system, the user inputs job information for shops to the inferring units A, B, and C that are in charge of the respective shops through the input/output unit I.

Figure 3:
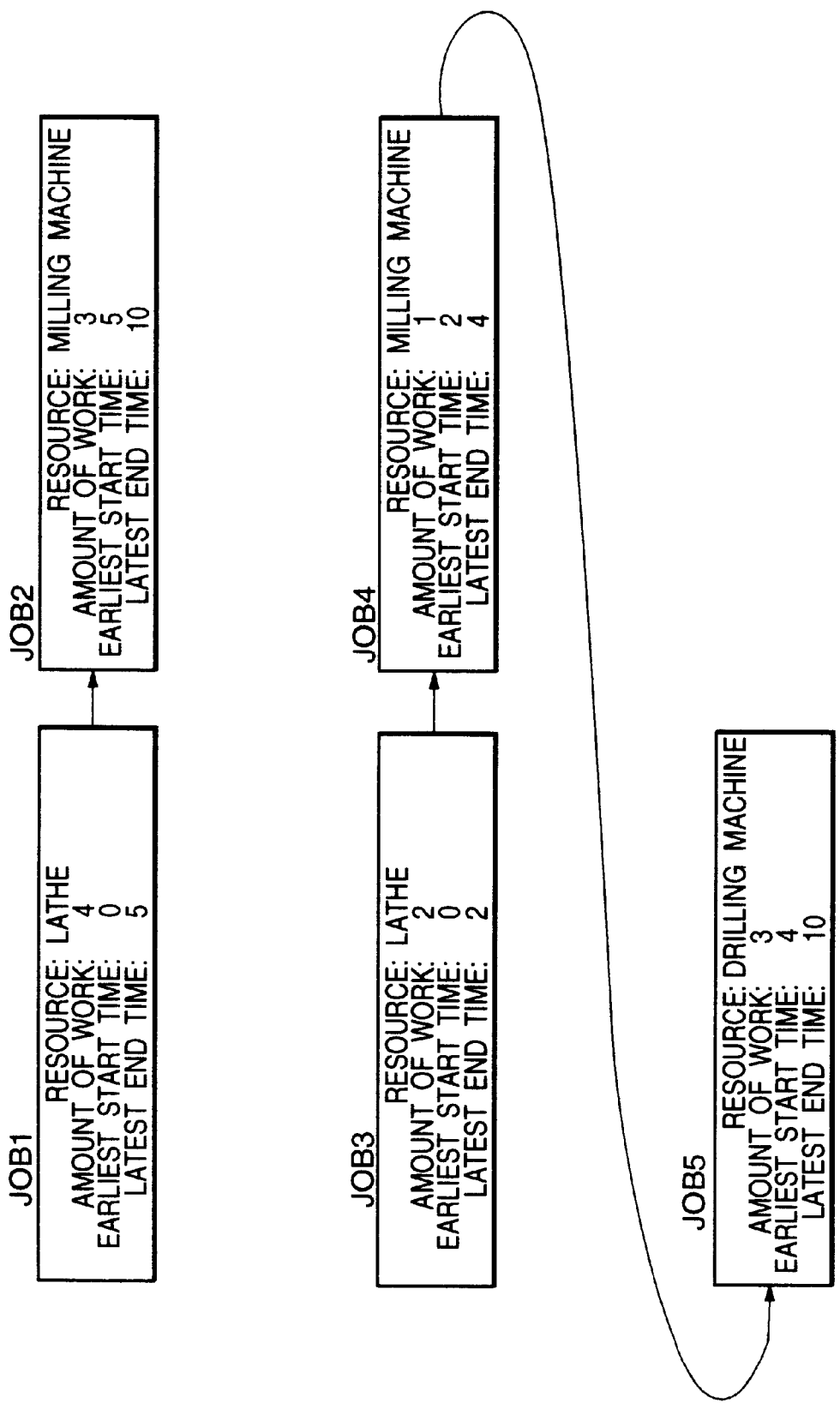
FIG. 3 is a schematic diagram showing an example of information of jobs according to an embodiment of the present invention.

FIG. 3 is a schematic diagram showing examples of jobs that are input. Referring to FIG. 3, in JOB 1, the resource to be used is a "lathe". The amount of work necessary for installing JOB 1 is "4". The available time range of JOB 1 is "0" to "5". An arrow that connects JOB 1 to JOB 2 represents that the next step is JOB 2 and that unless JOB 1 is completed, JOB 2 cannot be started.

In the first embodiment, since the inferring unit A is in charge of a shop of a lathe, information of JOB 1 and JOB 3 is input to the inferring unit A. Likewise, information of JOB 2 and JOB 4 is input to the inferring unit B. Information of JOB 5 is input to the inferring unit C. The input information is stored as data files of hard disks of the inferring units A, B, and C.

Data of jobs may have been created as files of hard disks and/or floppy disks and they may be read by the input/output unit I of each of the inferring units A, B, and C.

(2-2) Scheduling in Each Unit

Figure 4:
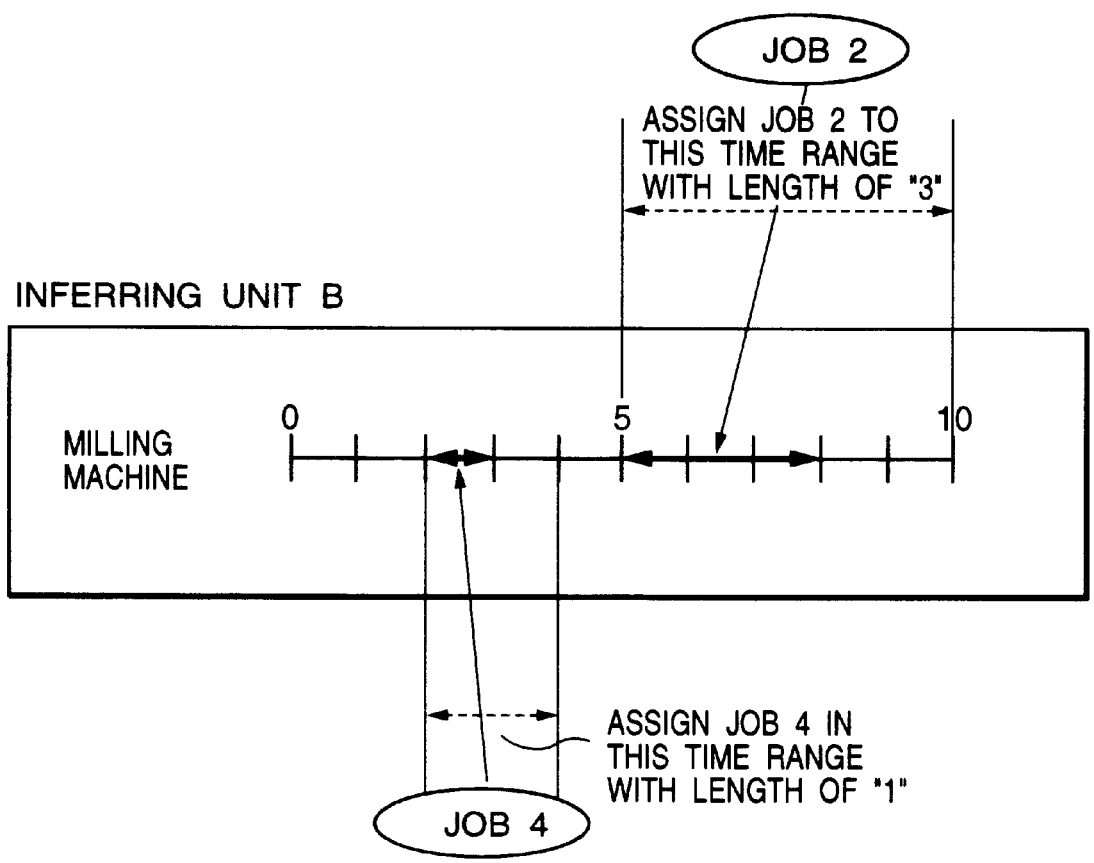
FIG. 4 is a schematic diagram showing a job assignment of an inferring unit B according to an embodiment of the present invention.

In each of the inferring units A, B, and C, the inference driving portion 11 of the inferring means 1 extracts jobs one after the other and performs an inference for assigning the jobs to relevant resources. For example, as shown in FIG. 4, in the inferring unit B, a resource is secured for JOB 2 in a time range from "5" to "10" with a length of "3". In FIG. 4, an alternative of a time period in which each job can be assigned is denoted by an arrow with a broken line. The alternative represents a time range between the latest end time of the preceding step of the current job and the earliest start time of the following step of the current job.

In FIG. 4, jobs to be assigned are not limited to JOB 2. Thus, a proper position for JOB 2 should be found for the remaining jobs. In this example, to allows JOB 2 to have a tolerance against the deadline, JOB 2 is assigned from the earliest position in the time range from "5" to "8" denoted by an arrow with a solid line. Likewise, JOB 4 is assigned in the time range from "2" to "3" denoted by an arrow with a solid line. Rules necessary for inferences such as an assignment from the earliest position have been stored in the inference knowledge storing means 2. The inferring means 1 performs an inference corresponding to such inference knowledge.

A solution obtained as an inferred result is stored in the inferred state storing means 3. In this case, depending on a condition applied to the inference knowledge, the number of solutions that satisfy a problem that has been input is not limited to one. When there are a plurality of solutions, they are stored in the inferred state storing means 3. In the case that knowledge "if there are a plurality of solutions, the priority thereof is assigned corresponding to a predetermined criterion" has been stored in the inference knowledge storing means 2, if there are a plurality of solutions, corresponding to the priority thereof, a proper solution can be obtained when an inferred result is used or a negotiation is performed. In addition to the above-described solution that is stored to the inferred state storing means 3, what solution has been stored to the inferred state storing means 3 is written to the state managing means 4.

(2-3) Determination of Necessity of Negotiation

Figure 5:
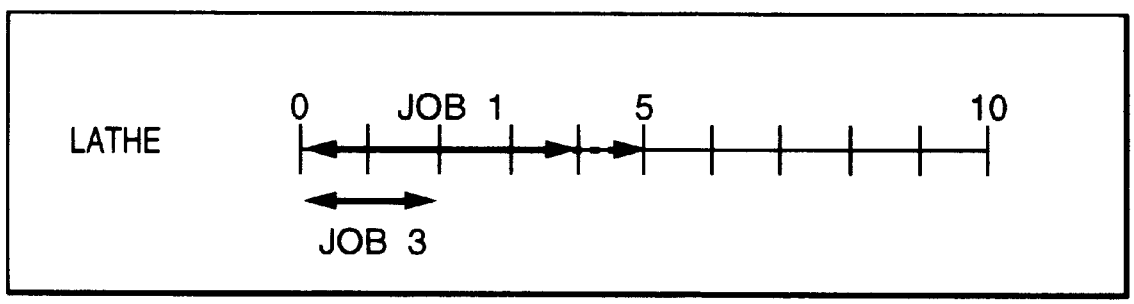
FIG. 5 is a schematic diagram showing an example of a job assignment according to an embodiment of the present invention.
Figure 5:
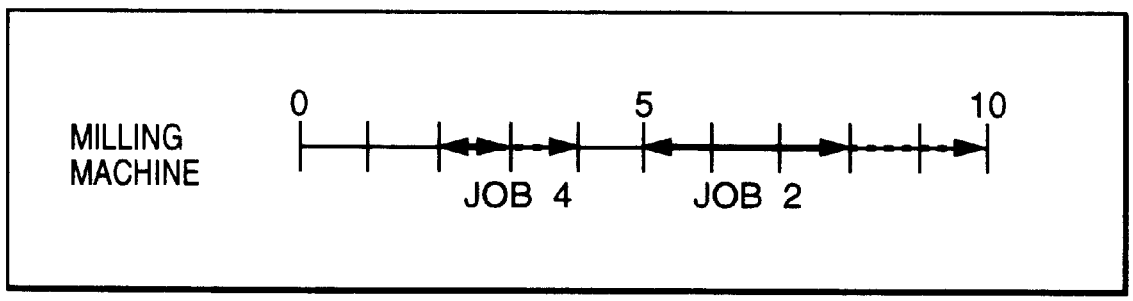
Figure 5:
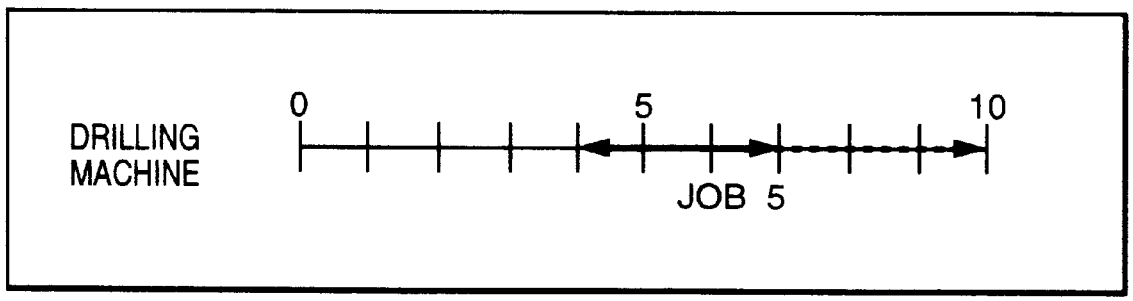

When a problem that has been input cannot be solved by a single inferring unit as an inferred result, negotiations with other units A, B, and C are required. In the first embodiment, while the inferring units A, B, and C are being operated in parallel, when given jobs are successively assigned, a state as shown in FIG. 5 takes place. In FIG. 5, a time range in which each job is assigned is denoted by an arrow with a solid line. A tolerance up to the latest end time of each job is denoted by an arrow with a dotted line.

In other words, in the inferring units B and C, jobs that have been input are assigned as arrows with solid lines. However, in the inferring unit A, since JOB 1 has been assigned, JOB 3 with latest end time="2" cannot be assigned. In addition, since the latest end time of JOB 1 is "5", even if JOB 1 is moved to the latest time position, a resource for JOB 3 with amount of work="2" cannot be secured.

In this case, the inferring unit A negotiates with the inferring unit B or C for an alleviation of the deadlines of jobs thereof. In reality, when the inference driving portion 11 of the inferring unit A has inferred that it cannot obtain a solution of the input problem as an inferred result thereof, the negotiation requesting portion 12 of the inferring means 1 requests the negotiating means 5 to negotiate with another inferring unit. The negotiating means 5 evaluates with what proposal to the other unit the problem of the local inferring unit can be solved. In other words, the object selecting means 51 of the negotiating means 5 selects a job and an operation time as a negotiation object corresponding to the negotiation strategies stored in the negotiation strategy storing means 6 and informs the inferring means 1 of the selected job and operation time as a negotiation object. The inference driving portion 11 of the inferring means 1 performs an inference corresponding to the proposal creation data so as to evaluate whether or not the problem of the local unit can be solved when a particular assumption of other inferring unit is satisfied.

When no assumption that allows the problem of the local inferring unit to be solved is not obtained at all, there is not room for a negotiation. Thus, the inferring means 1 outputs the result to the input/output unit I. In contrast, when the problem can be solved with the assumption satisfied, the inferring means 1 informs the proposal creating means 52 in the negotiating means 5 of the content of the assumption. Thus, the proposal creating means 52 creates the content of a proposal corresponding to the content of the assumption received from the inferring means 1.

Figure 6:
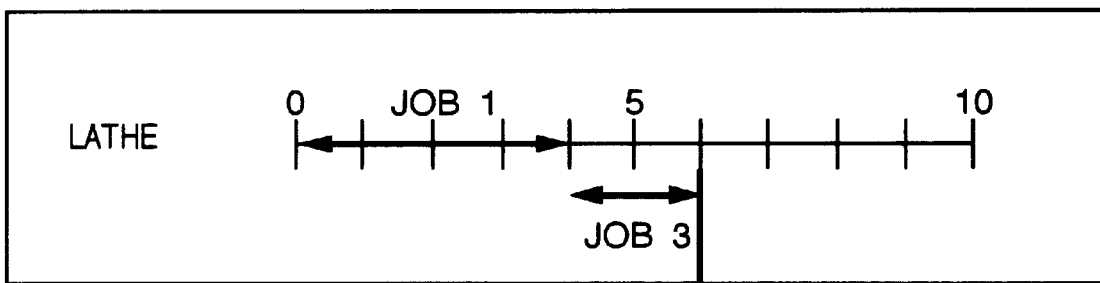
FIG. 6 is a schematic diagram showing an example of a job assignment according to an embodiment of the present invention.
Figure 6:
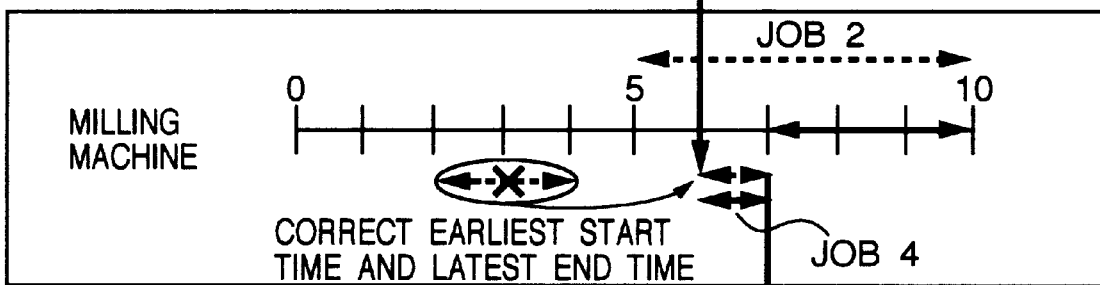
Figure 6:
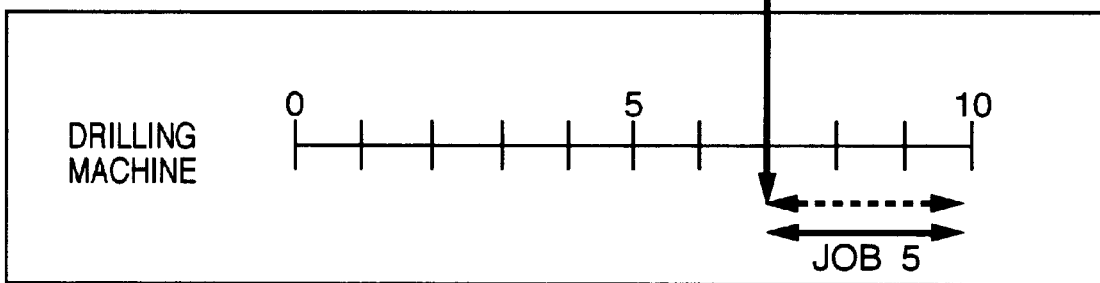

For example, as shown in FIG. 6, in the inferring unit A, to assign JOB 3 in the time range from "4" to "6" that follows JOB 1, it is necessary to satisfy an assumption of which JOB 4 that follows JOB 3 is assigned in the time range from "6" to "7", in the inferring unit B. In other words, to change the latest end time of JOB 3 to "6", it is necessary for the inferring unit A to negotiate with the inferring unit B in charge of JOB 4 that follows JOB 3 for the change of the earliest start time of JOB 4 to "6".

Since the number of assumptions that solve a problem is not limited to one, when there are a plurality of solutions that include the assumption inferred by the inference driving portion 11, these solutions are stored in the inferred state storing means 3. The state managing means 4 selects the solution with the highest priority as a negotiation object. An assumption that satisfies the solution becomes the first proposal of the negotiation. The selected solution (inferred state) is stored in the negotiating state storing means 7 in the negotiating stage.

(2-4) Negotiation Start Phase

Figure 9:
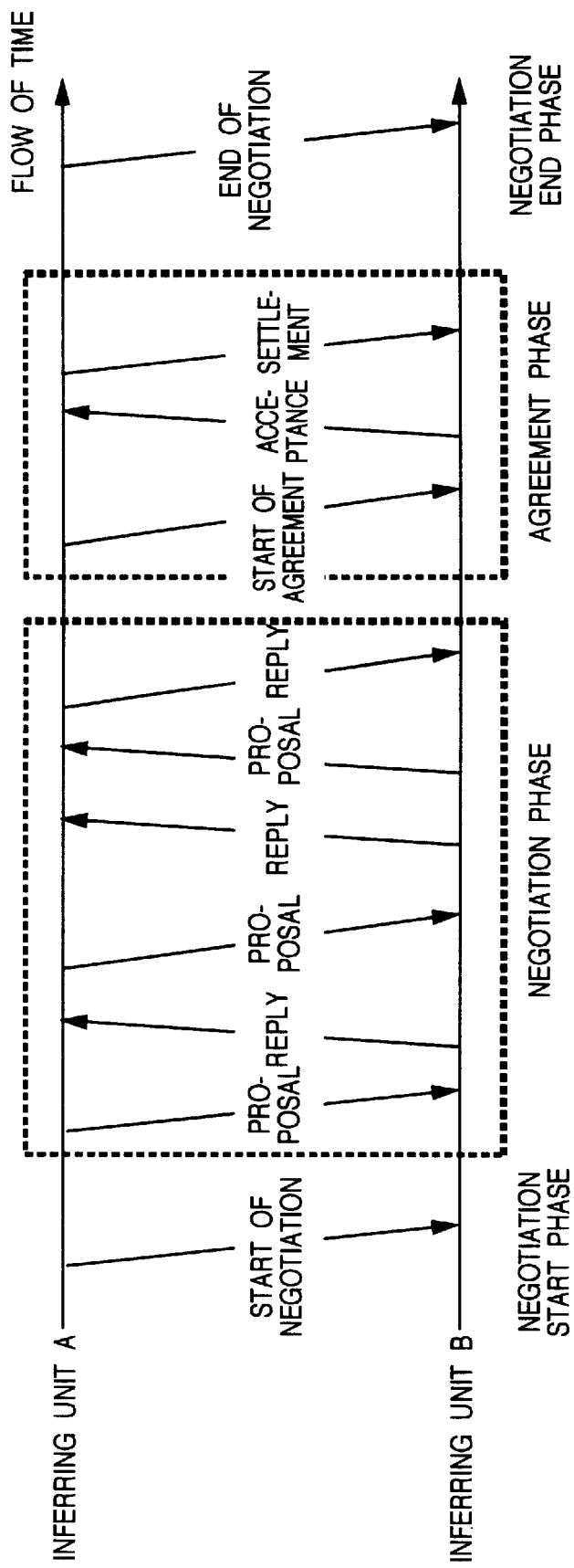
FIG. 9 is a schematic diagram showing an example of a flow of information exchanged between inferring units according to an embodiment of the present invention.

After the content of a proposal is created by the proposal creating means 52, the negotiating means 5 start a negotiation corresponding to the content of the proposal with another unit. In other words, as shown in FIG. 9, the message sending/receiving means 81 of the communicating means 8 sends a negotiation start message to the inferring unit B. When the inferring unit B acknowledges the reception of the negotiation start message, the negotiation is started.

(2-5) Negotiation Phase (2-5-1) Sending of Proposal

A negotiation phase is started when the data sending/receiving means 82 of the communicating means 8 sends the content of a proposal created by the proposal creating means 52 to the inferring unit B.

(2-5-2) Evaluation of Content of Proposal

When the data sending/receiving means 82 of the communicating means 8 in the inferring unit B receives the content of the proposal, the inferring unit B determines whether or not to accept the content of the proposal and sends a reply thereof to the inferring unit A. In other words, when the inferring unit B has received the proposal, as shown in FIG. 5, JOB 4 has been assigned in the time range from "2" to "3" and JOB 2 has been assigned in the time range from "5" to "8". To accept the proposal of which the earliest start time of JOB 4 is changed to "6", the latest end time of JOB 4 should be changed to "7". When the latest end time of JOB 4 can be changed to "7", since the latest end time of JOB 2 is "10", by moving the time range of JOB 2 to "7" to "10", the time range from "6" to "7" becomes blank. By assigning JOB 4 in the time range from "6" to "7", the proposal can be accepted.

In reality, a proposal received by the negotiating means 5 in the inferring unit B is sent to the proposal content evaluating portion 13 of the inferring means 1 along with the negotiation strategies stored in the negotiation strategy storing means 6. The proposal content evaluating portion 13 performs an inference with a precondition of the inferred state of the local inferring unit that has been stored and the content of the proposal received from the inferring unit A and evaluates whether there is a solution that satisfies the content of the proposal.

(2-5-3) Reply of Acceptance

When a solution that satisfies the content of a proposal has been inferred as an evaluated result, the proposal content evaluating portion 13 informs the reply managing means 53 in the negotiating means 5 of the result. The reply managing means 53 creates a reply message and sends the reply message to the inferring unit A through the message sending/receiving means 81 of the communicating means 8.

(2-5-4) Negotiation to Another Unit

A solution may not be obtained by the inferring unit B as an inferred result of the proposal content evaluating portion 13 corresponding to the content of the proposal. In this case, while the reply to the inferring unit A is being stored in the negotiating state storing means 7, the inferring unit B negotiates with another inferring unit. In other words, as shown in FIG. 5, in the inferring unit B, to change the latest end time of JOB 4 to "7", the earliest start time of JOB 5 that follows JOB 4 should be changed to "7". Thus, the inferring unit B negotiates with the inferring unit C that is in charge of JOB 5 for such a change.

As with the case that the inferring unit B receives a proposal from the inferring unit A, the inferring unit C with which the inferring unit B has negotiated performs an inference with a precondition of the proposal of the inferring unit B, evaluates whether or not there is a solution that satisfies the proposal, and sends a reply to the inferring unit B. In the example shown in FIG. 5, even if the earliest start time of JOB 5 is changed to "5", JOB 5 can be assigned, the inferring unit C accepts the proposal. Thus, the inferring unit B can assign JOB 4 in the time range from "6" to "7". Consequently, the inferring unit B can accept the proposal received from the inferring unit A.

A party with which the inferring unit B negotiates while a reply of a proposal received from the inferring unit A is deferred is not always a third party. In other words, a proposal as an exchange condition can be sent from the inferring unit B to the inferring unit A that is a proposer. In this case, the inferring unit A that has received a proposal as an exchange condition evaluates the content of the proposal and sends a reply to the inferring unit B.

(2-5-5) Reply of Acceptance of Proposal

When the inferring unit B has accepted the content of the proposal of the inferring unit A and the inferring unit A has received a reply that represents acceptance of the proposal from the inferring unit B, the negotiation phase is completed.

(2-5-6) Reply of Rejection of Proposal

When the inferring unit B cannot accept a proposal received from the inferring unit A as a negotiation with another inferring unit, the reply managing means 53 of the inferring unit B creates a reply that represents the rejection of the proposal and sends the reply to the inferring unit A through the communicating means 8.

As a result, the inferring unit A discards the inferred state as the negotiation object, selects an inferred state of the next priority, and negotiates with another inferring unit for an assumption that satisfies the selected inferred state as the next proposal. In this case, the inferred state that has been rejected by the inferring unit B and stored in the negotiating state storing means 7 is discarded. Instead, an inferred state that has been newly selected by the state managing means 4 is stored as an inferred state in a negotiating process to the negotiating state storing means 7. Likewise, when all proposals have been rejected as negotiation results of all alternatives stored in the inferred state storing means 3, since the problem cannot be solved in the local inferring unit and by a negotiation with other inferring units, the inferring unit A sends a negotiation completion message and terminates the negotiation with the other inferring units.

(2-6) Agreement Phase (2-6-1) Necessity of Agreement

As described in (2-5-5), when the local inferring unit receives a reply that represents the acceptance of the proposal from another inferring unit as a negotiating party, the negotiation phase is completed. Thereafter, an agreement phase takes place. In the agreement phase, it is confirmed that an assumption proposed by an inferring unit as a proposer in the last negotiation stage becomes a precondition of the subsequent inference performed by each inferring unit.

In other words, from a view point of an inferring unit that has sent a reply that represents the acceptance of a proposal, the inferring unit cannot know whether or not the inferring unit as the proposer has used the accepted proposal. For example, it is assumed that the inferring unit A sends proposals to both the inferring units B and C and that only when both the proposals have been accepted, the inferring unit A uses an assumption of the proposals. Even if the inferring unit B has accepted the relevant proposal, when the inferring unit C has rejected the relevant proposal, the inferring unit A does not use the assumption. However, if the inferring unit A performs the subsequent inference with a precondition of the accepted proposal in the state that the inferring unit B does not know that the assumption has not been used, the direction and result of the inference will become incorrect. Likewise, after the inferring unit B has sent a reply that represents the acceptance of a proposal to the inferring unit A, when the inferring unit A receives another proposal from another inferring unit and send a reply that represents the acceptance of the proposal, the inferring unit may not accept the relevant proposal. In this case, since the inferring unit A considers that a received reply is a proposal in the final stage and the proposal is used as a precondition of the subsequent inference, the inferring unit A may incorrectly perform the subsequent inference.

(2-6-2) Request of Agreement

Thus, according to the embodiment, in an agreement phase, it is confirmed whether or not the state in the final negotiation stage is agreed as a settled inferred state. In reality, when the reply managing means 53 of the inferring unit A has received a reply that represents the acceptance of the proposal, the agreement requesting means 54 of the negotiating means 5 sends an agreement request message to the inferring unit B that has received a reply from the message sending/receiving means 81.

(2-6-3) Determination of Agreement

In the inferring unit B that has received the agreement request message, the agreement determining means 55 of the negotiating means 5 evaluates whether or not to accept the agreement request. At this point, as in the example shown in FIG. 5, when the inferring unit B is negotiating with the inferring unit C, the inferring unit B should send the agreement request message to the inferring unit C so as to obtain the agreement of the inferring unit C.

The agreement determining means 55 has the following determined results.

(a) As a negotiation result, when the inferring unit A cannot infer a solution that satisfies a given problem, the inferring unit A cannot create the agreement message and cannot enter the agreement phase. Thus, the inferring unit A sends the negotiation completion message. In other words, when the inferring unit B has received the agreement message, the inferring unit A has used the proposal accepted by the inferring unit B. Thus, the agreement determining means 55 determines that the inferring unit B accepts the agreement request. In contrast, when the inferring unit A has sent the negotiation completion message at first, the agreement determining means 55 determines that the inferring unit B does not accept the agreement request.

(b) After the inferring unit B has sent a reply to the inferring unit A, when the inferring unit B sends a reply that represents the agreement of a proposal received from another inferring unit, even if the inferring unit B receives the agreement message from the inferring unit A, the reply to the inferring unit A is not a reply to a proposal in the final negotiation stage for the inferring unit B. Thus, the reply to the inferring unit A cannot be maintained because of the reply to the inferring unit C. Thus, the agreement determining means 55 determines that the inferring unit B cannot accept the agreement request.

(c) While the inferring unit B is negotiating with the inferring unit C, if the inferring unit C does not accept the proposal, the agreement determining means 55 determines that the inferring unit B cannot accept the agreement request.

Of course, the agreement determining means 55 does not determine whether or not to accept the proposal corresponding to only the agreement request message. In other words, the agreement request message may contain data that the inferring unit A has determined as a final solution. By comparing the data with the content of the inferred state stored in the inferring unit requested to agree with the proposal, it can be determined whether or not they are consistent.

(2-6-4) Acceptance of Agreement Request

When a proposal is accepted as the determined result of the agreement determining means 55, the message sending/receiving means 81 of the inferring unit B sends an acceptance message to the inferring unit A. The state managing means 4 of the inferring unit A stores a solution (negotiating state) of a negotiation object stored in the negotiating state storing means 7 as a settled inferred state in the inferred state storing means 3. In other words, the negotiating state represents a solution containing an assumption with a precondition of which a negotiation with another unit is effected. However, since the negotiation is effected, the solution can be used as a settled precondition for performing the subsequent inference instead of an assumption.

The inferring unit A changes a negotiating state to a settled inferred state. In addition, the inferring unit A sends a settlement message to the inferring unit B. The inferring unit A informs the inferring unit B that the inferring unit A has accepted the agreement. The inferred state storing means 3 of the inferring unit B stores the negotiating state stored as a settled inferred state in the negotiating state storing means 7. Thereafter, the inferring unit B performs the subsequent inference corresponding to the settled inferred state.

(2-6-5) Rejection of Agreement Request

When the agreement determining means 55 has determined not to accept the agreement, the inferring unit B sends the agreement rejection message to the inferring unit A. Thus, the inferring unit A that has received the agreement rejection message cancels the negotiation and discards the solution in the negotiating state stored in the negotiating state storing means 7. In addition, the inferring unit B performs an inference corresponding to a proposal received from the inferring unit A and discards a solution stored in the negotiating state storing means 7.

(2-7) Negotiation Completion Phase

After the negotiating state agreed by each inferring unit as described in (2-6-4) has been settled, the end message is exchanged among each inferring unit and thereby the negotiation is completed. When the agreement request is rejected, the end message is exchanged instead of the settlement message and thereby the negotiation is completed. When a solution that each unit does not satisfy cannot be obtained, the negotiation phase directly advances to the negotiation completion phase rather than the agreement phase.

(2-8) Examples of Messages

Next, examples of messages exchanged among each unit for negotiations and agreements that have been exemplified are as follows:

A start: session 1

A proposal: session 1, negotiation 1, earliest start time of JOB 4, 6

B proposal: session 1, negotiation 2, earliest start time of JOB 5, 7

C reply: session 1, negotiation 2, OK

B reply: session 1, negotiation 1, OK

A agreement: session 1

B acceptance: session 1, OK

C acceptance: session 1, OK

A settlement: session 1

A end: session 1

These messages are only examples. In the negotiation phase, it is not necessary to include "start" and "end" as independent messages. In other words, messages for proposals and agreements function as messages of "start" and "end".

(3) Explanation of Flow Chart

Figure 7:
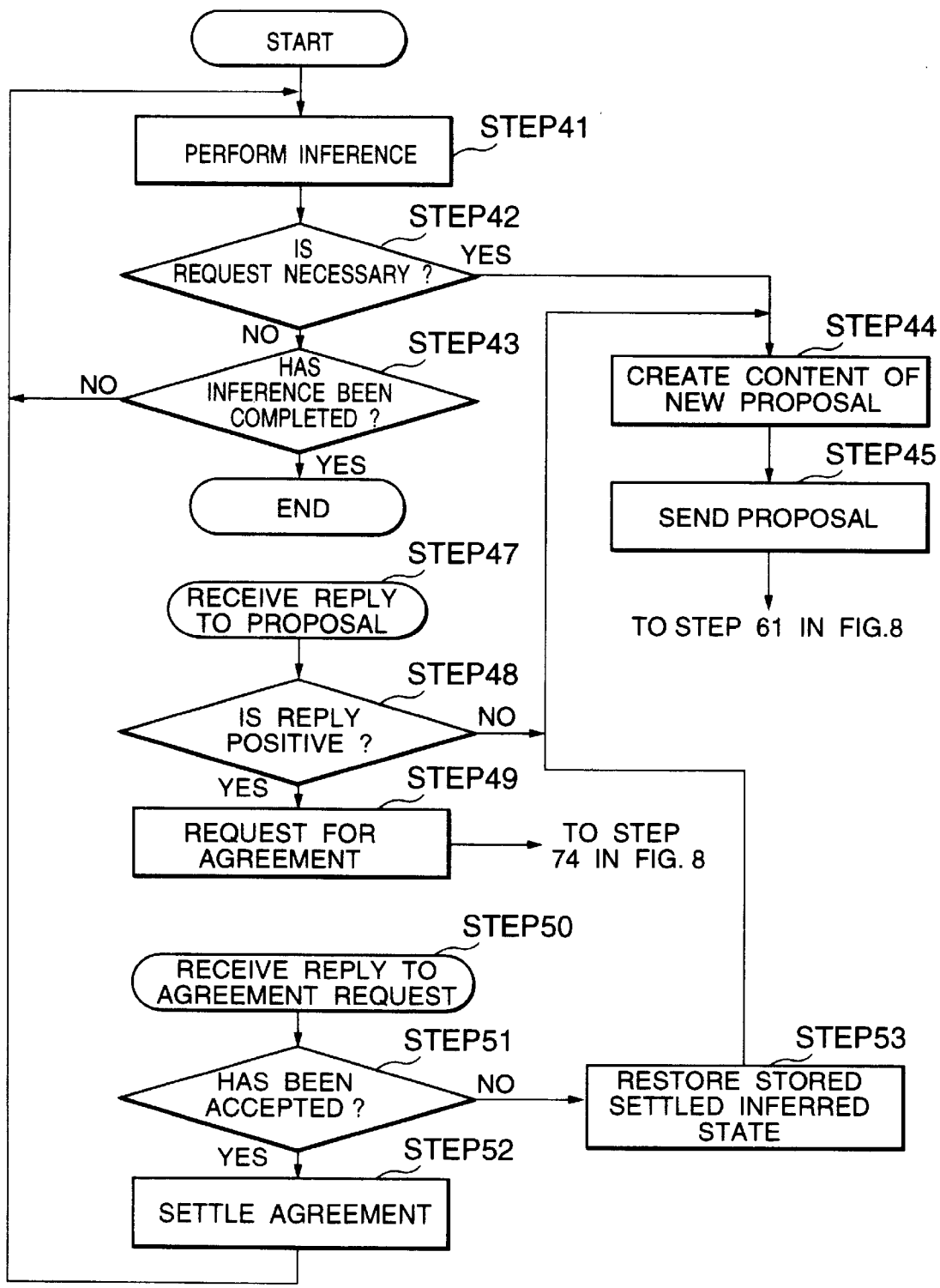
FIG. 7 is a flow chart showing processes of negotiations and agreements of an inferring unit on a requesting side according to an embodiment of the present invention.
Figure 8:
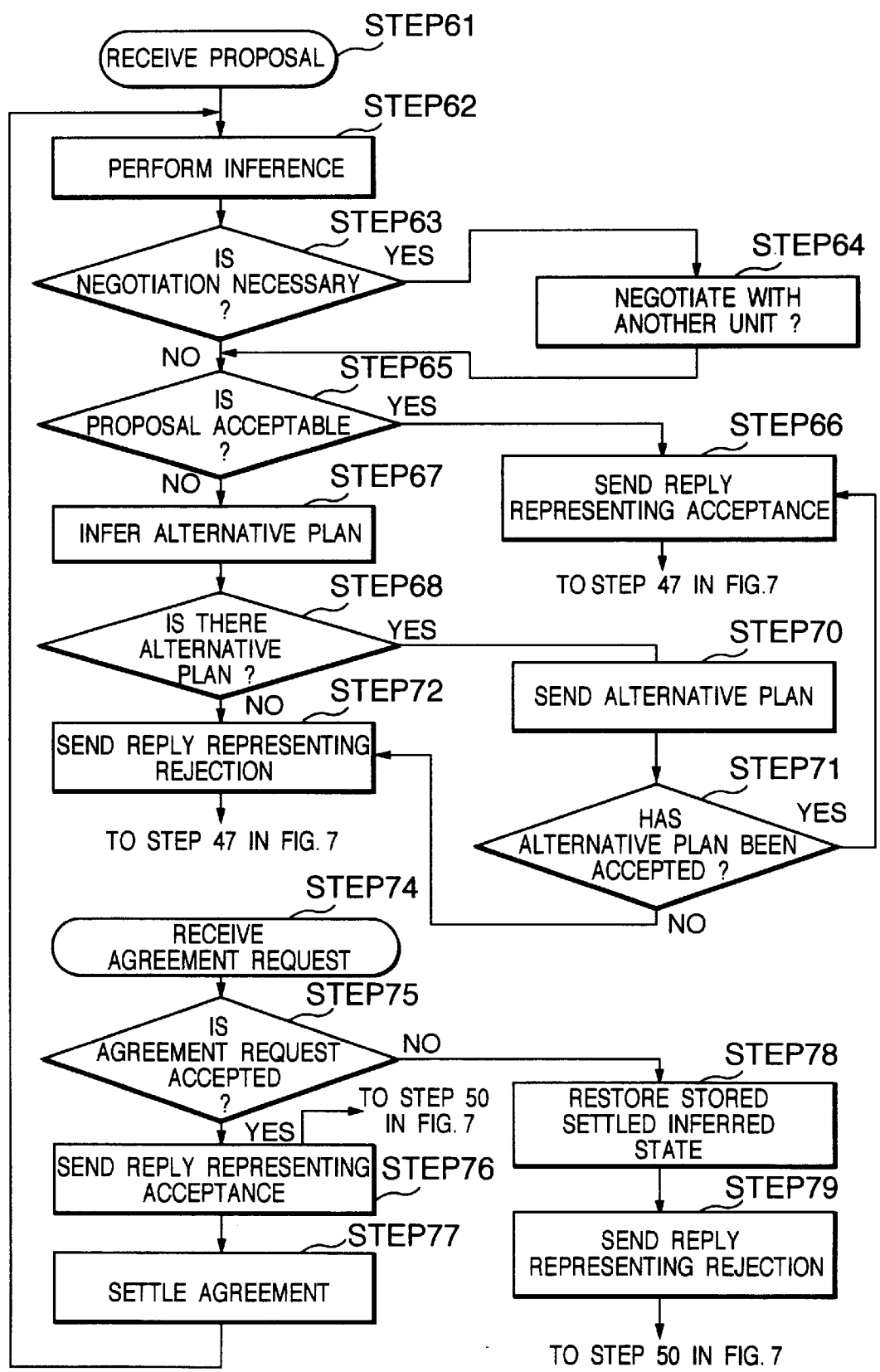
FIG. 8 is a flow chart showing processes of negotiations and agreements of an inferring unit on a requesting side according to an embodiment of the present invention.

FIGS. 7 and 8 are flow charts showing the operation of the embodiment. FIG. 7 is a flow chart of processes for negotiations and agreements viewed from the requesting side (on the inferring unit A side). FIG. 8 is a flow chart of processes for negotiations and agreements viewed from the requested side (on the inferring unit B side). FIG. 9 is a schematic diagram showing a part of information exchanged between the units A and B.

(3-1) Start of Negotiation

While the inferring unit A is performing an inference for solving a problem (at step 41), if the inferring unit A requires to negotiate with another unit for solving the problem (at step 42), the inferring unit A creates the content of a proposal (at step 44) and sends the proposal to the inferring unit B as the negotiating party (at step 45).

(3-2) Reception of Proposal and Reply thereof

When the inferring unit B receives a proposal from the inferring unit A (at step 61 in FIG. 8), the inferring unit B progressively infers the content (at step 62) and determines whether or not to accept the content of the proposal (at step 63). When the inferring unit B cannot satisfy the content of the proposal received from the inferring unit A and thereby needs to negotiate with another unit, the inferring unit B negotiates with the other unit (at step 64). As a result of the negotiation with the other unit or when the inferring unit B can accept the proposal received from the inferring unit A (at step 65), the inferring unit B sends a reply that represents the acceptance of the reply to the inferring unit A (at step 66).

When the inferring unit B has inferred a alternative plan instead of the proposal received from the inferring unit A (at step 67) and thereby has obtained an alternative plan (at step 68), the inferring unit B sends the alternative plan to the inferring unit A (at step 70). In other words, when it is necessary for the inferring unit A to accept the alternative plan received from the inferring unit B so as to allow the inferring unit B to accept the proposal received from the inferring unit A, the inferring unit B sends the alternative plan to the inferring unit A, waits for a reply that represents whether or not the inferring unit A accepts the alternative plan, and sends a reply that represents whether or not to accept the proposal received from the inferring unit A. When the inferring unit A has received the alternative plan, it evaluates the alternative plan, and sends a reply that represents whether or not to accept the alternative plan to the inferring unit B corresponding to the flow chart (at step 61 and later) shown in FIG. 8. The evaluation of whether or not the inferring unit accepts the alternative plan is performed in the same manner as the case that the inferring unit B that has received the proposal cannot solve the problem and negotiates with another inferring unit for the problem. When the inferring unit A has accepted the alternative plan (at step 71), it sends a reply that represents the acceptance of the proposal to the inferring unit A (at step 66).

When the inferring unit B cannot accept the proposal received from the inferring unit A, the other inferring unit has refused the proposal at step 64, and there is no alternative plan, the inferring unit B sends a reply that represents the rejection of the proposal to the inferring unit A (at step 72).

(3-3) Reception of Reply

The inferring unit A that has sent the proposal receives a reply from the inferring unit B (at step 47 in FIG. 7). When the reply represents the rejection of the proposal (at step 48), the flow returns to step 44. At step 44, the inferring unit A sends a new proposal to the inferring unit B. When the reply represents the acceptance of the proposal, the agreement phase takes place (see FIG. 9).

(3-4) Agreement (3-4-1) Request for Agreement

In the agreement phase, the inferring unit A, B, and C agree that the inferred state that is consistent in the inferring units A, B, and C is treated as a settled inferred state for a precondition of the subsequent inference. In other words, the inferring unit A that has received a reply that represents the acceptance of the proposal (at step 48) requests the inferring unit B whether or not to accept the inferred state corresponding to the content of the proposal as a settled inferred state (at step 49).

(3-4-2) Evaluation for Acceptance

The inferring unit B that has received an acceptance request at step 74 in FIG. 8 evaluates whether or not to accept the acceptance request (at step 75). When the inferring unit B can accept the acceptance request, it sends a reply to the inferring unit A (at step 76). In addition, the inferring unit B stores the inferred state corresponding to the proposal received from the inferring unit A as the settled inferred state (at step 77). Thereafter, in the inferring unit B, the settled inferred state becomes a basis of the subsequent inference. As described above, the settling process may be performed after the inferring unit B sends a reply that represents the acceptance of the agreement request and waits for the settling process message from the inferring unit A.

When the inferring unit B cannot accept the acceptance request (at step 78), it sends a reply that represents the rejection of the acceptance request to the inferring unit A (at step 79). In other words, after the inferring unit B has sent a reply that represents the acceptance of the proposal to the inferring unit A, if an inferred state that is different from the proposal received from the inferring unit A takes place in the inferring unit B (for example, the inferring unit B sends a different proposal to another inferring unit or receives another proposal from another inferring unit), since the inferred state corresponding to the proposal received from the inferring unit A is not consistent with the later inferred state, the inferring unit B cannot accept the proposal. Thus, the inferring unit B sends a reply to the inferring unit A.

(3-4-3) Settling Process

When the inferring unit A has received a reply of the agreement request from the inferring unit B (at step 50), the inferring unit A performs a different process depending on the content of the reply (at step 54). If the reply represents the acceptance of the agreement request, the inferring unit A performs a process for changing the inferred state of the proposal sent to the inferring unit B to a settled inferred state (at step 52). In contrast, if the reply to the agreement request is a rejection of the agreement, the inferring unit A discards the inferred state of the content of the proposal and restores the inferred state that has been stored (or a settled inferred state that has been obtained through a negotiation) (at step 53) and evaluates another proposal (at step 45).

(3) Completion of Negotiation

When a settled inferred state is obtained, the end message is exchanged among the inferring units. In addition, a settled inferred state that had been stored before the negotiation has been performed is discarded. Thus, the negotiation is completed (completion phase). When the negotiation has not been effected, a settled inferred state that has been stored is restored and the inferred state is canceled. When the inferring unit A cannot receive a reply that represents the acceptance of a proposal from anther inferring unit, the end message is exchanged without entering the agreement phase. Thus, the negotiation is completed.

(4) Effect of First Embodiment

In the first embodiment, since a settled inferred state is explicitly agreed among the inferring units A, B, and C, a basis of an inference can be obtained. Thus, an inference can be effectively performed. Particularly, before a negotiation is performed, production schedules of the inferring unit A are consistent with a production schedule of the inferring unit B. When the inferring unit A negotiates with another inferring unit, because of the occurrence of an assumption "if the latest end time of JOB 4 can be changed to "7"", it is unclear whether or not the assumption is valid as a basis of the subsequent inference. In contrast, according to the first embodiment, the state of which the inferring units A, B, and C are consistent is agreed as a settled inferred state. In the subsequent negotiation, an inference is performed on the basis of the latest settled inferred state. Thus, the basis of the inference is clear.

In addition, according to the first embodiment, when an inconsistent state takes place as a result of an inferred result and an agreement cannot be successfully made, a stored inferred state can be used. Thus, the updating of the inferred state can be canceled and the consistent state can be easily restored. Moreover, according to the first embodiment, in the initial inferred state, the settled inferred state is blank. However, when the settled inferred state takes place because of an agreement, the subsequent inference is performed on the basis of the settled inferred state. Since the agreements are successively accumulated, a complicated problem can be effectively inferred through negotiations.

As described above, according to the cooperative inferring apparatus of the first embodiment, while a restriction that cannot be solved by a single inferring unit is changed through negotiations, a consistent production schedule can be created.

(5) Second Embodiment (5-1) Necessity of Multiple-Negotiations

According to the first embodiment, when a plurality of solutions based on different assumptions are obtained, negotiations are performed for the solutions in the order of the priority. In other words, when a negotiation for one solution has not been effected, a proposal based on the next solution is sent to another unit. However, such negotiations take a long time. A solution with higher priority is not always a solution that is accepted through a negotiation. In addition, such a solution is not always a solution that is advantageous for other inferring units and the entire cooperative inferring apparatus.

To solve such a problem, according to the second embodiment of the present invention, when a plurality of proposals corresponding to a plurality of solutions (inferred states) based on different assumptions are obtained, negotiations are performed for these solutions with the other inferring units relating to the proposals.

(5-2) Structure of Second Embodiment

The structure of the second embodiment is basically the same as the structure of the first embodiment. However, an inferring means 1, a negotiating means 5, and a communicating means 8 are structured so that a plurality of negotiations can be performed in parallel. In addition, a state managing means 4 and a negotiating state storing means 7 are structured so that a plurality of negotiating states can be managed and stored at the same time.

(5-3) Operation of Second Embodiment

In the second embodiment having the above-described structure, an example of which a plurality of negotiations are performed at the same time will be described.

In the state shown in FIG. 5, as an inferred result of the inferring means 1, in addition to a solution of which the latest end time of JOB 3 is changed, there is another solution of which the latest end time of JOB 1 is changed to "6". In the first embodiment, the state managing means 4 selected one of two solutions. However, there is another strategy of which negotiations are performed for two solutions at the same time and then a solution that can be agreed is used.

Figure 10:
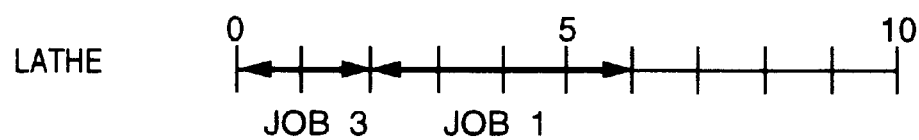
FIG. 10 is a schematic diagram showing another example of a job assignment according to an embodiment of the present invention.
Figure 10:
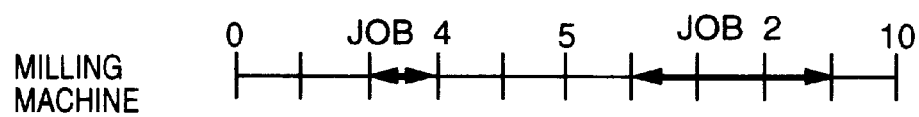
Figure 10:
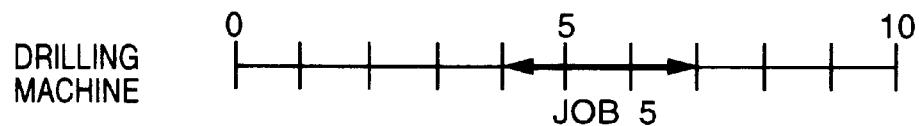

Thus, in the second embodiment, the inferring unit A negotiates with another unit for two solutions at the same time. In this case, the state managing means 4 extract two inferred states as negotiation objects and stores them in the negotiating state storing means 7. As the first selectable option, the inferring unit A negotiates with the inferring unit B for the change of the latest end time of JOB 3 to "6". This negotiation is the same as the negotiation in the first embodiment. As the second selectable option, the inferring unit A negotiates with the inferring unit B for the change of the latest end time of JOB 1 to "6". In this negotiation, even if the inferring unit B changes the earliest start time of JOB 2 that follows JOB 1 to "6", when the time range of the milling machine is secured from "6" to "9", the inferring unit B can perform the jobs. Thus, the inferring unit B can accept the proposal. FIG. 10 shows the last negotiating state.

In this case, the inferring unit A selects the second selectable option of which the result has been obtained earlier than the result of the first selectable option. Thus, the inferring unit A cancels the first negotiation, accepts the second negotiation, and secures a settled inferred state. The cancellation of the negotiation and the agreement thereof are performed by exchanging messages between inferring units as with the first embodiment. In other words, in the case that the negotiating means 5 of the second embodiment perform a plurality of negotiations with other units in parallel, when the negotiating means 5 obtains a first reply that represents the acceptance of a proposal, the negotiating means 5 sends an agreement message to the inferring unit that has sent the reply. In addition, the negotiating means 5 sends a negotiation end message to the other unit.

(5-4) Effect of Second Embodiment

According to the second embodiment, two negotiations can be performed at the same time. An inferred state of which a negotiation has been effected at first can be used as a solution of the problem. Thus, the efficiency of the inference can be much more improved than that of the first embodiment. In addition, in negotiations, proposals and replies that have not been accepted are discarded as they are not agreed by other inferring units. The subsequent inference can be performed on the basis of the original settled inferred state. Even if negotiations are not effected, the consistence among the inferring units is not lost. In the example shown in FIG. 10, even if a negotiation is not effected, since the inferred state shown in FIG. 5 is agreed among all the inferring units A, B, and C as a settled inferred state. Thus, since an inferring unit of which a negotiation is not effected can be restored to the settled inferred state, the consistency can be assured.

(6) Third Embodiment

The first embodiment is very effective to perform negotiations. However, when protocol messages such as a negotiation start message and an agreement start message are mixed with real negotiation messages such as an earliest start time change request, they are difficult to install or reuse in another system. To solve such a problem, according to a third embodiment of the present invention, each element of negotiations is hierarchically structured.

It should be noted that modules of the third embodiment do not just correspond to the individual means of the first embodiment. In other words, each means is structured with a plurality of modules and these modules are hierarchically categorized corresponding to functions of inferences and negotiations.

(6-1) Structure of Third Embodiment

Figure 11:
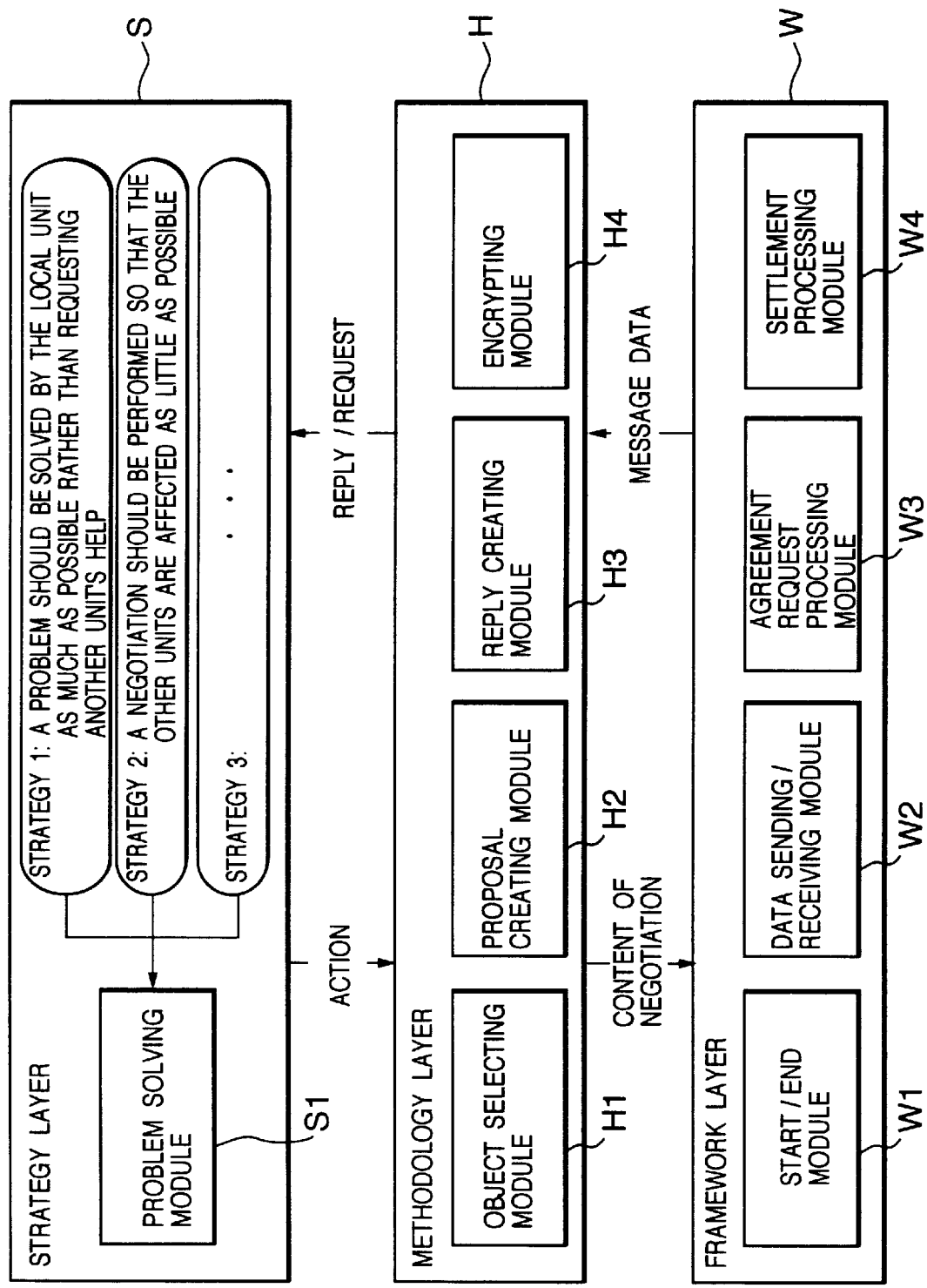
FIG. 11 is a schematic diagram showing a hierarchical structure according to an embodiment of the present invention.

FIG. 11 is a functional block diagram showing the structure of the third embodiment. Referring to FIG. 3, functions of inferring units A, B, and C that a cooperative inferring apparatus has are structured with three layers that are a framework layer W (lower layer), a methodology layer H (intermediate layer), and a strategy layer S (upper layer). The framework layer W defines a process in common with each unit. The methodology layer H defines a process for each problem of the cooperative inferring apparatus. The strategy layer S defines processes of individual inferring units A, B, and C.

The strategy layer S uses the function of the methodology layer H. The methodology layer H uses the function of the framework layer W. Thus, negotiations and agreements are performed. In the third embodiment, since the negotiating process is hierarchically structured, when the upper layer is structured, it is not necessary to consider the content of the process of the lower layer. Thus, the cooperative inferring unit and the cooperative inferring method can be easily structured. In addition, inferences can be easily reused and modified.

The framework layer W defines the order of the format of negotiations. The framework layer W corresponds to the function for obtaining a settled inferred state through negotiations and agreements in the cooperative inferring apparatus according to the present invention. The framework layer W is common in all the inferring units A, B, and C that negotiate with each other. When a new inferring unit is provided, the framework layer W can be used. In this embodiment, an agreeing means that settles an inferred state is structured as the framework layer W in the lower layer. The upper methodology layer H and the strategy layer S can be used to easily settle the inferred state through the framework layer W. Thus, the methodology layer H and the strategy layer S can be easily structured. In reality, the framework layer W has a message communicating module (start/end module) W1, a data sending/receiving module W2, and an agreement request processing module W3, and a settlement processing module W4. The message communicating module W1 creates and interprets negotiation start/end messages. The data sending/receiving module W2 creates and interprets messages that represent proposals and replies in the negotiation phase. The agreement request processing module W3 creates and interprets an agreement request message. The settlement processing module W4 obtains a settled inferred state when the other inferring units A, B, and C agree with a consistent inferred state.

The methodology layer H defines a process depending on a problem to be applied. The methodology layer H is common in inferring units that solve the same problem. For example, in this embodiment, "to designate a proper operation time for each unit", it is necessary "to advance or delay the operation time of a job". The methodology layer H has an object selecting module H1 and a proposal creating module H2. The object selecting module H1 designates the operation time (earliest start time or latest end time) of a job as a negotiation object. The proposal creating module H2 designates a valid operation time of the local unit to be moved. As a function of the methodology layer H, there is a reply creating module H3. When the local unit receives a request message, the reply creating module H3 receives a determination whether or not the content of the proposal can be agreed from the strategy layer S and sends a reply that represents the acceptance or rejection of the proposal. In addition, as another module of the methodology layer H, there is an encrypting module H4 that encrypts a confidential message such as amount of money.

The strategy layer S defines negotiation strategies of the individual inferring units A, B, and C. Examples of the negotiations are as follows. Examples of negotiation strategies stored in the negotiation strategy storing means 6 are as follows. In the case of a lathe, "a job that has been assigned should not be unnecessarily moved". In the case of a milling machine, "a problem should be solved by the local unit as much as possible rather than requesting another unit".

In the case of a drilling machine, "a request should be accepted as much as possible". The lathe, milling machine, and drilling machine may have a common strategy such as "a negotiation should be performed so that the other jobs are not adversely affected". In the first embodiment, when the inferring unit A cannot assign a job, it immediately asks another unit for cooperation. However, even if a problem cannot be solved, when it is left for a while, the problem may be solved through negotiations from other inferring units. When the local unit cannot solve a problem, it asks another unit for cooperation or leaves it for a while depending on negotiation strategies of the local inferring unit. These negotiation strategies are installed in the strategy layer S. The strategy layer S has a problem solving module S1 that solves a problem corresponding to individual strategies.

(6-2) Operation of Third Embodiment

In the third embodiment that has the above-described structure, the strategy layer S uses the function of the methodology layer H. The methodology layer H uses the function of the framework function W. For example, the strategy layer S commands the methodology layer H for an action (how to move a particular object) and data (what amount to move) for solving a problem.

Figure 12:
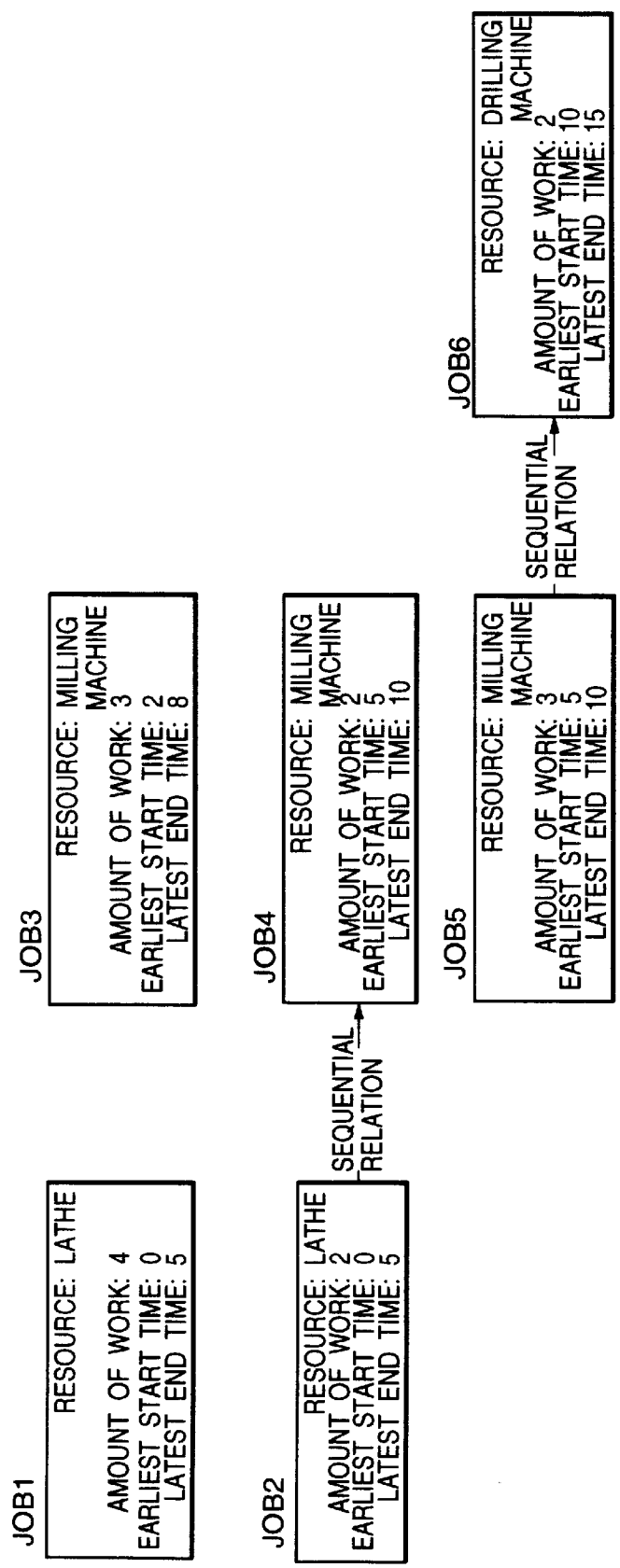
FIG. 12 is a schematic diagram showing an example of information of jobs according to an embodiment of the present invention.
Figure 13:
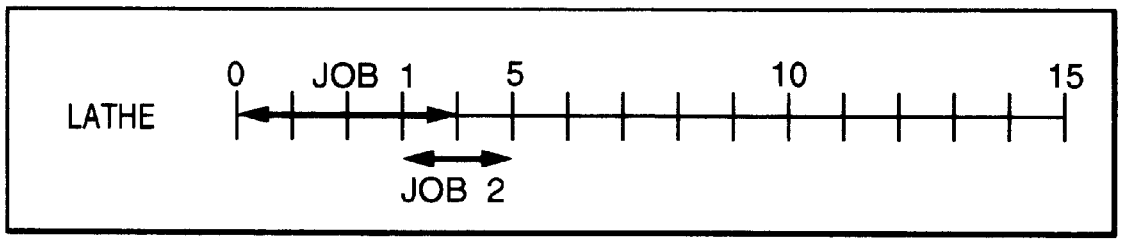
FIG. 13 is a schematic diagram showing an example of a job assignment according to an embodiment of the present invention.
Figure 13:
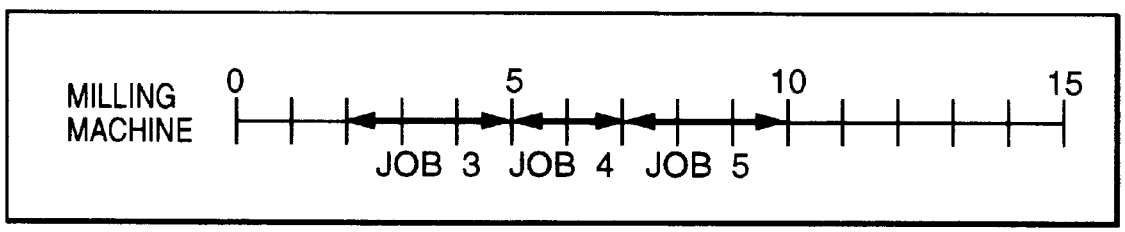
Figure 13:
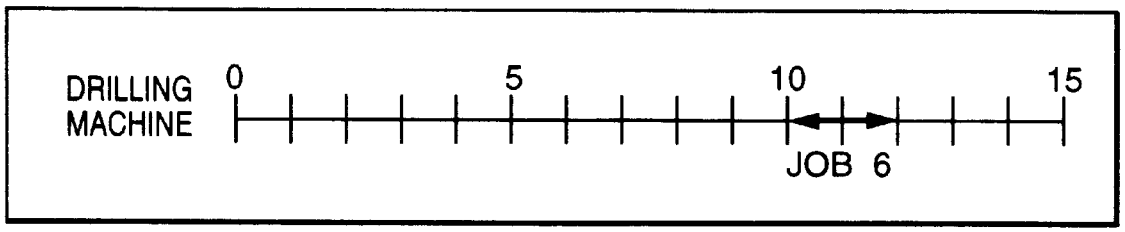

Next, an example of an inference according to the third embodiment will be described. In this example, it is assumed that jobs shown in FIG. 12 have been assigned. The inferring unit B that is in charge of a milling machine assigns JOB 3, JOB 4, and JOB 5 in the order (see FIG. 13). At this point, the inferring unit B assigns JOB 3 in the time range from "2" to "5"; JOB 5 in the time range from "5" to "7"; and JOB 5 in the time range from "7" to "10". The inferring unit C that is in charge of a drilling machine assigns JOB 6 in the time range from "10" to "12".

The inferring unit A that is in charge of a lathe assigns JOB 1 in the time range from "0" to "4". However, the inferring unit A cannot assign JOB 2 because the latest end time "5" of JOB 2 cannot be satisfied. Thus, the strategy layer S of the inferring unit A infers a solution of the problem.

The strategy layer S can find two solutions. As the first solution, the latest end time of JOB 2 is delayed. As the second solution, JOB 1 is restored in the non-assigned state. After JOB 2 is assigned, JOB 1 is reassigned at the latest end time that is later than that of the original latest end time. The strategy layer S selects one from the two solutions. In reality, since the inferring unit A that is in charge of the lathe has a strategy of which "a job that has been assigned should not be unnecessarily moved", the strategy layer S selects the first solution. In addition, the strategy layer S selects "1" as a tolerance for "a negotiation should be performed so that the other jobs are not adversely affected". The selected solution is sent in a predetermined format such as "latest end time of JOB 2+1" to the methodology layer H.

When the methodology layer H receives the selected solution, it selects "latest end time of JOB 2=earliest start time of JOB 4=(present) 5" as a negotiation object. In addition, the methodology layer H selects "6" as data of the content of the request in the negotiation. Moreover, the methodology layer H selects the inferring unit B that in charge of the milling machine corresponding to JOB 4 as a negotiating party. These selected data is sent to the framework layer W as the lower layer.

When the message communicating module (start/end module) W1 and the data sending/receiving module W2 of the framework layer W in the inferring unit A sends a negotiation start message and a proposal content message to the inferring unit B that is in charge of the milling machine, the request content message is sent from the framework layer W to the methodology layer H in the inferring unit B that has received these messages.

In the methodology layer H, the reply creating module H3 analyzes the received request message and knows that the negotiation object is "earliest start time of JOB 4" and data as the content of the request is "6". Next, the methodology layer H determines whether or not the content of the proposal is valid. In reality, to cause the earliest start time of JOB 4 to become "6", the reply creating module H3 determines that JOB 5 should be moved and sends the determined result to the strategy layer S. The strategy layer S determines that JOB 5 and JOB 4 should be moved to the time range from "5" to "8" and the time range from "8" to "10" corresponding to the strategy "a problem should be solved by the local unit as much as possible rather than requesting another unit". Thus, the inferring unit B accepts the proposal received from the inferring unit A.

When the reply creating module H3 of the methodology layer H receives the determined result, the framework layer W sends a reply that represents OK to the inferring unit A. When the inferring unit A that is in charge of the lathe has received the reply that represents OK from the inferring unit B, the inferring unit A knows that the negotiation has been successfully effected, the framework layer W thereof agrees with the negotiation, generates a newly settled inferred state, and completes the negotiation.

Figure 14:
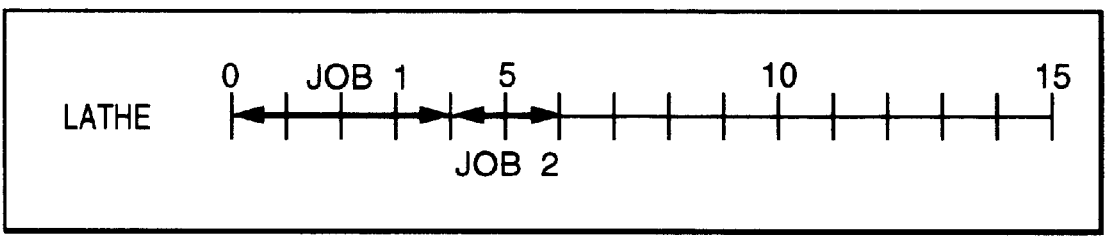
FIG. 14 is a schematic diagram showing an example of a job assignment according to an embodiment of the present invention.
Figure 14:
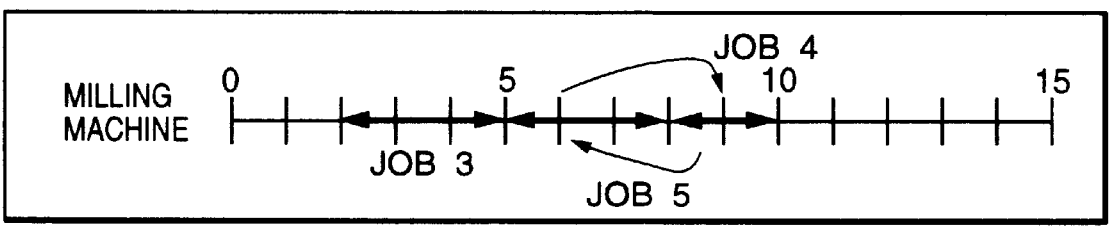
Figure 14:
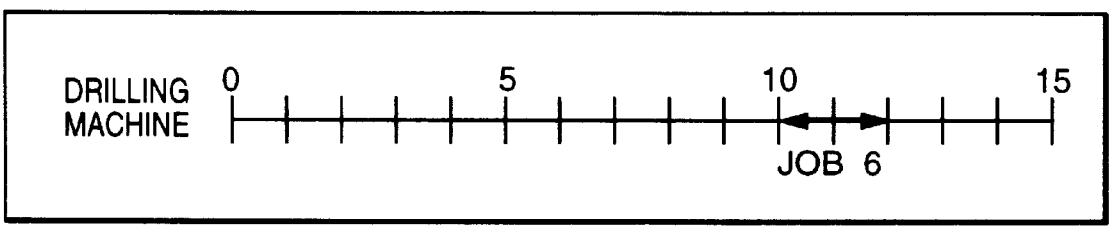

FIG. 14 is a schematic diagram showing the state that jobs have been assigned through negotiations. In the inferring unit B, after the order of JOB 4 and JOB 5 had been changed, JOB 2 that precedes JOB 4 has been properly performed by the inferring unit A.

(7) No Limitation of Embodiments of Present Invention

It should be noted that the present invention is not limited to the above-described embodiments. In other words, the present invention has other embodiments that follow.

For example, the present invention is not limited to the scheduling system. Instead, the present invention can be applied to an inferring system for solving another type of problems.

Each inferring unit is not limited to an independent hardware unit. For example, each inferring unit can be accomplished as a process of each computer connected through a network.

In addition, each inferring unit can be accomplished by a dedicated hardware unit or a dedicated software application accomplished on hardware. Particularly, in the first embodiment, to distinguish the inferring means from the negotiating means, the negotiating means manages the sending/receiving of messages and data and the inferring means performs inferences. However, it is not necessary to structure the inferring means and negotiating means in such a manner. For example, when the negotiating means has a dedicated inferring means, the inferring means performs inferences corresponding to commands received from the input/output unit. The dedicated inferring means in the negotiating means creates and evaluates proposals necessary in the negotiation stage and performs inferences necessary therefor.

It is not necessary to cause negotiations and agreements to be explicit in the formats of a start phase, a negotiation phase, an agreement phase, and an end phase. The start phase and end phase may be omitted. Alternatively, the start phase and the end phase can be substituted with messages of a negotiation and an agreement. An agreement may be confirmed by exchanging a message. Alternatively, an agreement may be confirmed by writing agreed data in a memory or a file shared by units.

In the third embodiment, it is not necessary to structure three layers that are the framework layer, the methodology layer, and the strategy layer. Instead, two layers or four layers that are convenient may be used.

The cooperative inferring apparatus and the cooperative inferring method according to the present invention are mainly accomplished by a computer program. Thus, a record medium that records such a program is also an embodiment of the present invention.

As described above, according to the first to third embodiments, each inferring unit can perform an inference corresponding to a settled inferred state agreed among each inferring unit through negotiations. Thus, since the basis of inferences is consistent among each inferring unit, inferences can be effectively performed.

Next, with reference to the accompanying drawings, a fourth embodiment of the present invention will be described. According to the fourth embodiment, each problem solving means has a negotiation strategy group with two standpoints. The first standpoint is the priority of the individual problem solving means. The second standpoint is a tolerance of a request performed between the local problem solving means and another problem solving means of the negotiating party. When the local unit negotiates with another unit, the problem solving means autonomously selects and changes negotiation strategies corresponding to the negotiation history between the local unit and the other unit as a negotiating party, the current internal state, and the current external state.

As with the first embodiment of the present invention, the fourth embodiment is applied to a scheduling system for making a production schedule.

In such a scheduling system, it is assumed that the following schedule information has been assigned so as to produce a product A. The schedule information applies to a product B and a product C.

First step: lathe
Amount of work: 2h
Earliest start time: 0
Latest end time: 20
Second step: milling machine
Amount of work: 4h
Earliest start time: 20
Latest end time: 60
Third step: drilling machine
Amount of work: 2h
Earliest start time: 60
Latest end time: 80

In this embodiment, schedulers (equivalent to problem solving means) 151a, 151b, 151c of respective shops assign required time (amount of work) in respective schedule tables corresponding to such schedule information.

Assuming such a scheduling problem, the fourth embodiment will be described.

Figure 15:
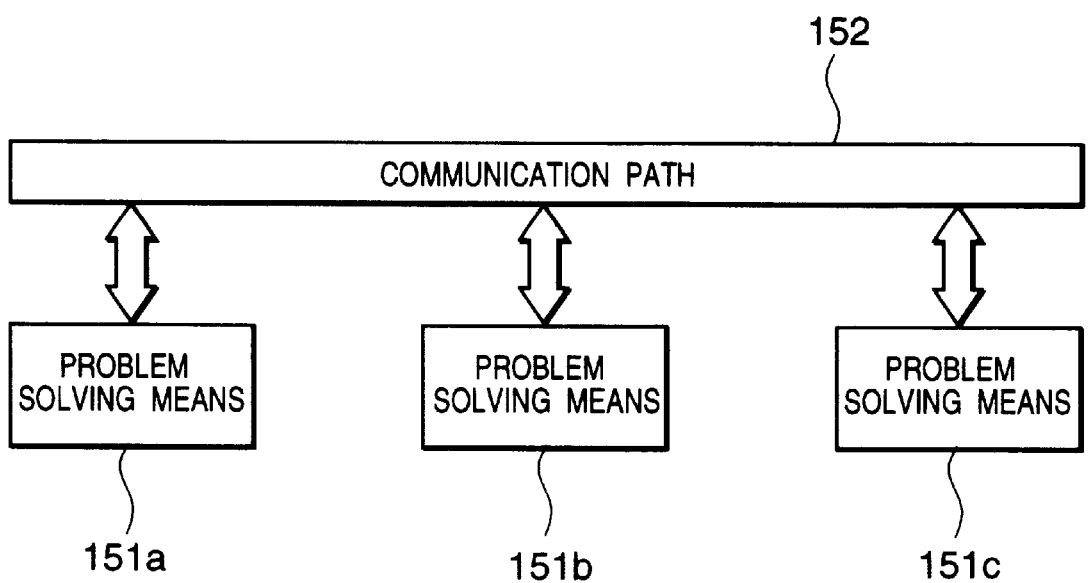
FIG. 15 is a block diagram showing a conceptual structure of a cooperative inferring unit according to an embodiment of the present invention.

FIG. 15 shows a conceptual structure of the cooperative inferring apparatus according to the fourth embodiment of the present invention. Referring to FIG. 15, the cooperative inferring apparatus according to the fourth embodiment has problem solving means 151a, 151b, and 151c. These problem solving means 151a, 151b, and 151c are mutually connected through a communication path 152. Such problem solving means may be composed of respective processors or a single processor that performs a plurality of logical processes in parallel.

In this embodiment, the problem solving means 151a, 151b, and 151c are schedulers that assign jobs to a lathe, a milling machine, and a drilling machine, respectively.

Figure 16:
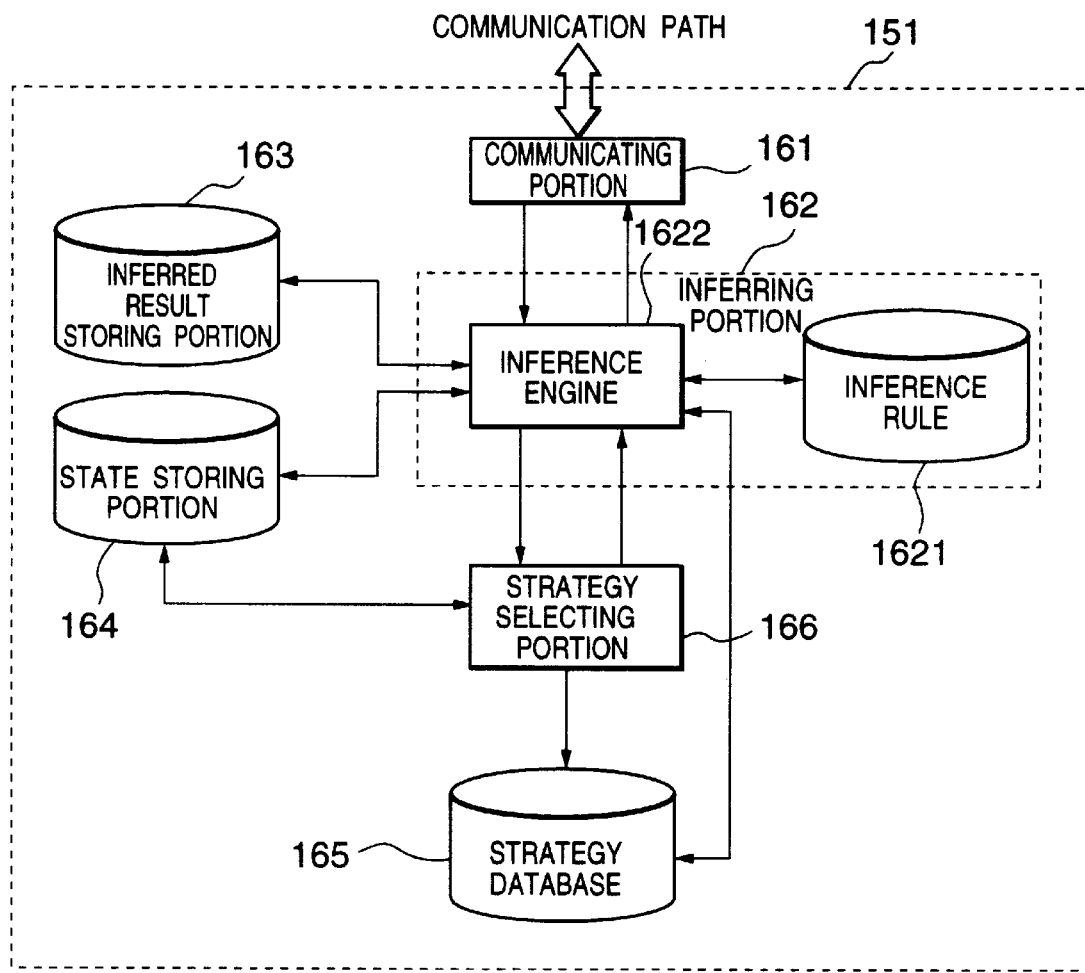
FIG. 16 is a block diagram showing the structure of a problem solving means according to an embodiment of the present invention.

FIG. 16 is a block diagram showing the structure of each of the problem solving means 151a, 151b, and 151c according to the fourth embodiment of the present invention. Referring to FIG. 16, each of the problem solving means 151a, 151b, and 151c comprises a communicating portion 161, an inferring portion 162, an inferred result storing portion 163, a state storing portion 164, a strategy database 165, and a strategy selecting portion 166. The communicating portion 161 exchanges messages with the other problem solving means. The inferring portion 162 solves a given scheduling problem. The inferred result storing portion 163 stores a created schedule. The state storing portion 164 stores a negotiation history, the current internal state, and the current external state. The strategy database 165 stores a plurality of negotiation strategies. The strategy selecting portion 166 selects a negotiation strategy corresponding to the information stored in the state storing portion 164 and sends the selected negotiation strategy to the inferring portion 162. The inferring portion 162 has an inference rule 1621 and an inference engine 1622.

The strategy selecting portion 166 has the following strategy rules for solving the above-described scheduling problem.

In this embodiment, the standpoint of the order of the problem solving means used to assign the priority to a problem of the local problem solving means and problems of other problem solving means is referred to as "role". The standpoint of the intensity of a request between the local solving means and another problem solving means is referred to as "transaction".

In this embodiment, the "role" is categorized as three types that are an upper role, an equal role, and a lower role. Each problem solving means have one of three roles. Problems are processed by the problem solving means in the order of the upper role, the equal role, and the lower order. In this case, the local problem solving means designated the equal role solves a problem thereof with higher priority than a problem of the problem solving means designated the lower role. In addition, the local problem solving means designated the equal role solves a problem of the problem solving means designated the upper role with higher priority than a problem of the local problem solving means.

In addition, the "transaction" is categorized as two types that are a tolerance transaction and a minimum transaction. Each problem solving means performs one of these transactions in a negotiation. The intensity of a request in a transaction between the local problem solving means and another problem solving means of the negotiating party is designated in the order of the tolerance transaction and the minimum transaction. The local problem solving means designated the tolerance transaction requests the negotiating party for a transaction of which a predetermined tolerance is added to the minimum request. When the local problem solving means receives a request from the negotiating party, considering whether or not the tolerance of the local problem solving means can be assured, the local problem solving means determines whether or not to accept the request.

Rule 1:
if a negotiation is started (initial state)
then "role"=equal, "transaction"=tolerance Rule 2:
if the local problem solving means has received a first reply that represents the rejection against a first request of the local problem solving means from a negotiating parity and then has received a second reply the represents the rejection against a second request of the local problem solving means from the negotiating party (in other words, the local problem solving means has received two or more replies that represent the rejection of requests from one negotiating party)

then "role"=upper, "transaction"=minimum

Rule 3:

if the local problem solving means has sent a first reply that represents the rejection against a first request of a negotiating party and then has sent a second reply that represents the rejection against a second request of the negotiating party (in other words, the local problem solving means has sent two or more replies that represent the rejection to one negotiating party), then "role"=lower, "transaction"=minimum In the initial state of the strategy selection, it is assumed that each scheduler negotiates with each negotiating party in such a manner that they are in the equal positions. In addition, each scheduler creates a request and determines whether or not to accept a request in such a manner that it considers a tolerance.

However, when the local scheduler has received two or more replies that represent the rejection, the "role" becomes upper and thereby the local scheduler negotiates with the other scheduler so that jobs of the local scheduler have higher precedence than jobs of the other scheduler. In addition, the "transaction" becomes minimum and thereby the local scheduler creates or determines to accept a request in the minimum range.

In contrast, when the local scheduler has sent two or more replies that represent the rejection, the "role" becomes lower and thereby the local scheduler negotiates with the other scheduler so that jobs of the local scheduler have lower precedence than jobs of the other scheduler. In addition, the "transaction" becomes minimum and thereby the local scheduler creates or determines to accept a request in the minimum range.

Next, negotiation strategies performed by the strategy selecting portion 166 will be described.

FIG. 17 is a table showing categorized negotiation strategies.

"Role"=equal:

When the strategy selecting portion 166 has received an operation time change request (that causes the earliest start time or the latest end time that represent the operation time among each step to be advanced or delayed), the strategy selecting portion 166 interprets the content of the request, determines whether or not to execute it, and sends a reply to a negotiating party. When the request cannot be executed as the determined result of the strategy selecting portion 166, it does not send a new request that allows it to accept to the request of the negotiating party.

When the local problem solving means has failed to assign a job, it creates a request that allows it to assign the job and sends the request to the problem solving means of the negotiating party.

When the local problem solving means has received a reply that represents the rejection against the request of the local strategy selecting portion 166, it may send a different operation time change request or send the same operation time change request later on.

"Role"=upper:

When the local strategy selecting portion 166 has received an operation time change request from a negotiating party, the local strategy selecting portion 166 sends a reply that represents the rejection against the request. In other words, in this case, the local strategy selecting portion 166 does not accept a request.

When the local problem solving means 166 has failed to assign a job, it creates a request that allows it to allocate the job and sends the request to the problem solving means of the negotiating party.

When the local problem solving means 166 has received a reply that represents the rejection against a request of the local strategy selecting portion 166, it may send a different operation time change request or send the same operation time change request later on.

"Role"=lower:

When the local problem solving means 166 has received an operation time change request, it interprets the content of the request and determines whether or not to accept the request. When the request can be accepted as the determined result of the local problem solving means 166, it sends a reply that represents the acceptance to the negotiating parity. When the request cannot be accepted as the determined result of the local problem solving means 166, it sends a new request that allows it to accept the original request to the negotiating party.

When the local problem solving means has failed to assign a job, it creates a request that allows it to allocate the job and sends the request to the problem solving means of the negotiating party.

When the local problem solving means has received a reply that the rejection, it may send a different operation time change request or send the same operation time change request later on.

"Transaction"=tolerance:

In the case that the local problem solving means has received an operation time change request and determines whether or not to accept the operation time change request, when it cannot have a tolerance of n hours after it changes the operation time, it determines not to accept that the request.

The local problem solving means creates an operation time change request in such a manner that it moves the operation time as small as possible and then adds a tolerance for n hours.

"Transaction"=minimum:

In the case that the local problem solving means has received an operation time change request and determines whether or not to accept the request, when it can change the operation time, even if it does not have a tolerance, it determines not to accept the request.

The local problem solving means creates an operation time change request in such a manner that it moves the operation time as small as possible and creates a request without any tolerance.

In this embodiment, all the problem solving means have respective strategy selecting portions and negotiation strategies that are the same. However, it should be noted that the present invention is not limited to such a structure. In other words, each problem solving means may have individual strategy selecting portions and negotiation strategies that differ from each other.

The cooperative inferring apparatus with the above-described structure solves a scheduling problem in the following manner. In this example, it is assumed that the following schedule information that represent production processes of a produce A and a product B has been input to the problem solving means 151*a*, 151*b*, and 151*c* that are in charge of a lathe, a milling machine, and a drilling machine, respectively.

"Product A"

First step: Lathe

Amount of work: 3

Earliest start time: 0

Latest end time: 5

Second step: Milling machine
Amount of work: 3
Earliest start time: 5
Latest end time: 10
"Product B"
First step: Lathe
Amount of work: 2
Earliest start time: 0
Latest end time: 5
Second step: Milling machine
Amount of work: 3
Earliest start time: 5
Latest end time: 10
Third step: Drilling machine
Amount of work: 2
Earliest start time: 10
Latest end time: 15

The problem solving means 151*a*, 151*b*, and 151*c* secure required amounts of time (amounts of work) in the individual schedule tables corresponding to the schedule information of the product A and product B.

Figure 18:
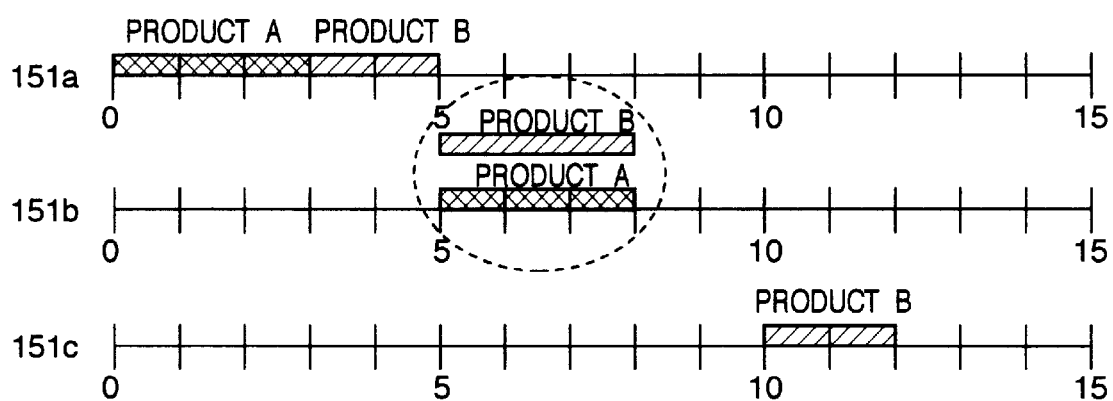
FIG. 18 is a schematic diagram showing an example of a schedule table according to an embodiment of the present invention.

For example, the problem solving means 151*b* causes the inferring portion 162 to assign a job of the product A (amount of work=3) in a proper position of the time range from "5" to "10". In this case, the inferring portion 162 assigns the job in the time range from "5" to "8" in such a manner that the job is assigned at the available earliest position. Likewise, the other problem solving means cause respective inferring portions to assign respective jobs so as to create schedule tables as shown in FIG. 18.

Although the problem solving means 151*a*, 151*b*, and 151*c* create individual schedule tables, if jobs assigned are inconsistent (as denoted by a dotted line in FIG. 18), the relevant problem solving means negotiate with other problem solving means.

Figure 19:
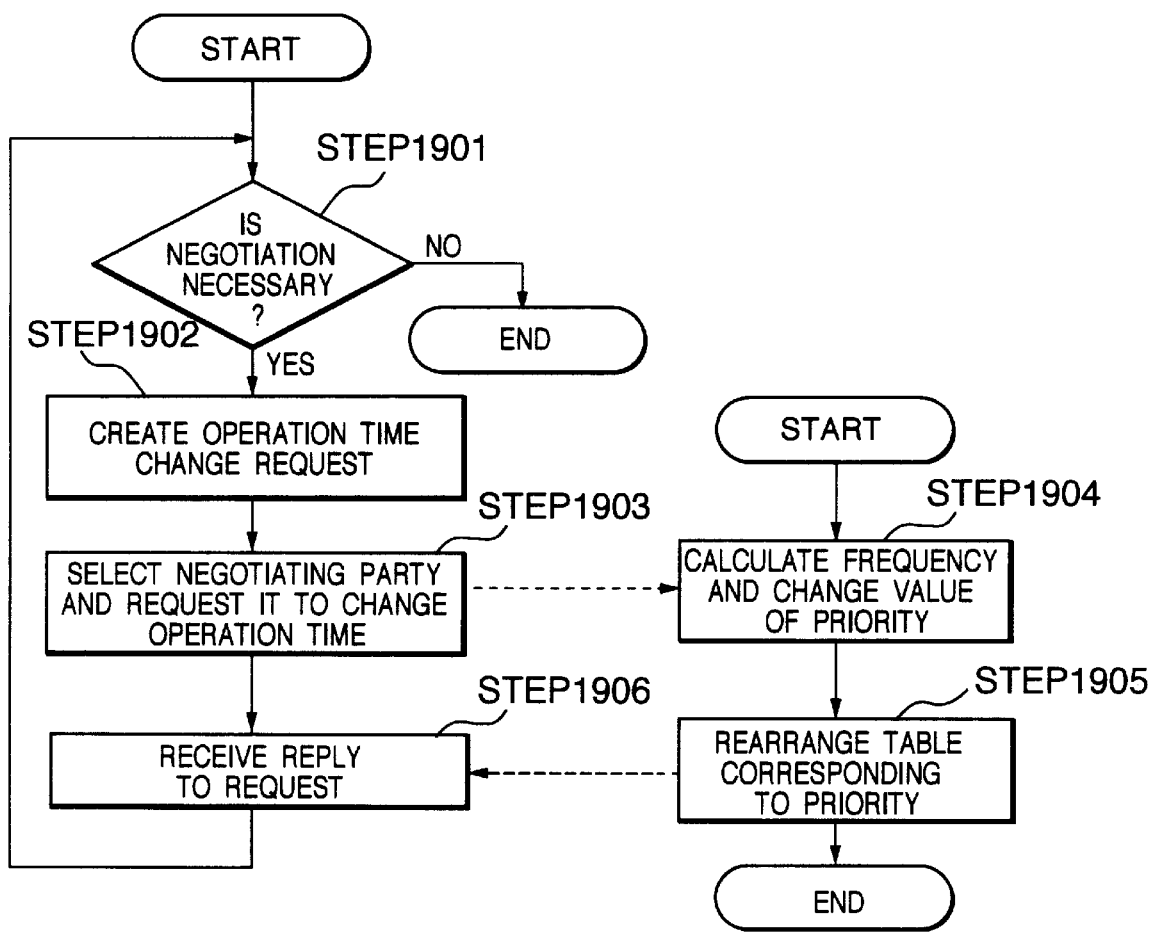
FIG. 19 is a flow chart showing a process of a problem solving means in a negotiating state according to an embodiment of the present invention.
Figure 20A:
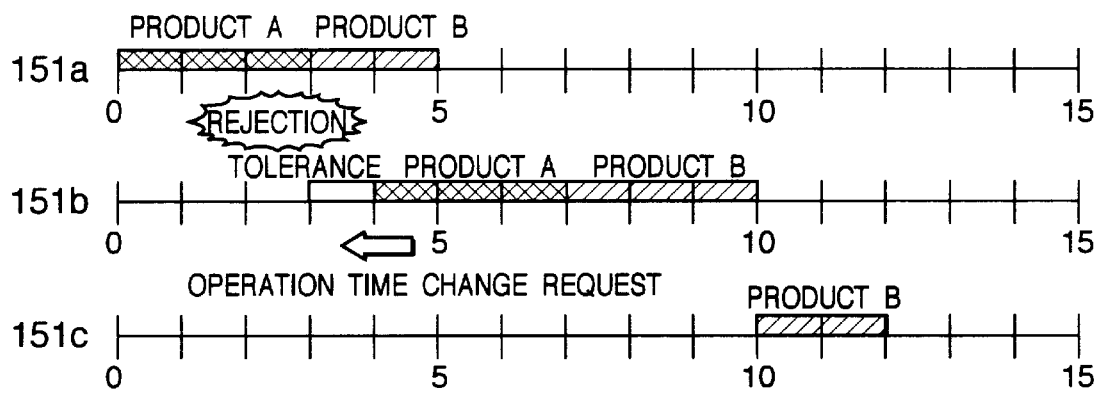
FIG. 20A is a schematic diagram showing a negotiating process between problem solving means according to an embodiment of the present invention.
Figure 20B:
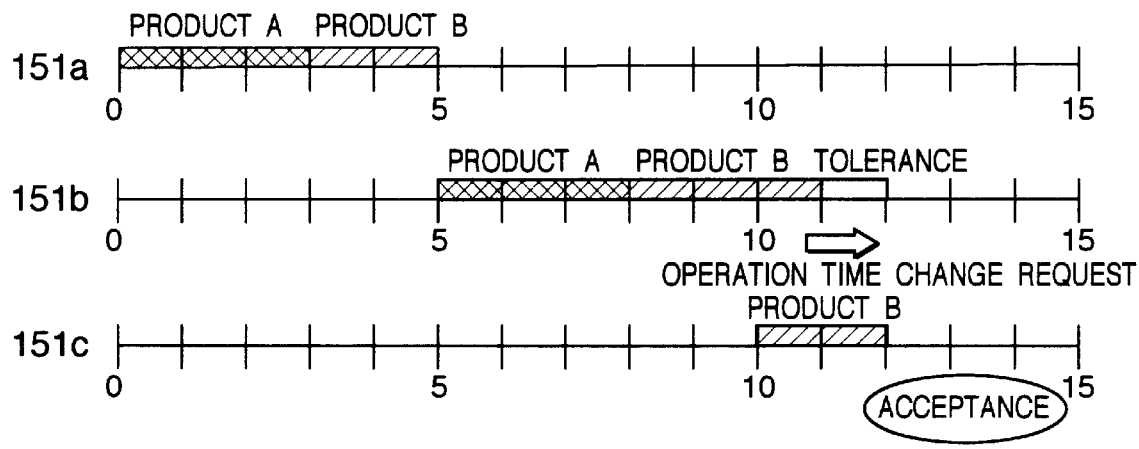
FIG. 20B is a schematic diagram showing a negotiating process between problem solving means according to an embodiment of the present invention.
Figure 20C:
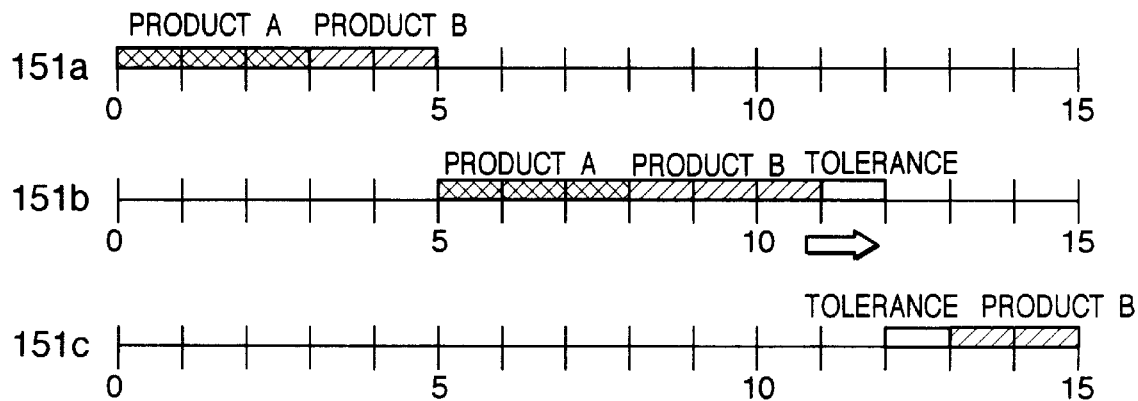
FIG. 20C is a schematic diagram showing a negotiating process between problem solving means according to an embodiment of the present invention.
Figure 21:
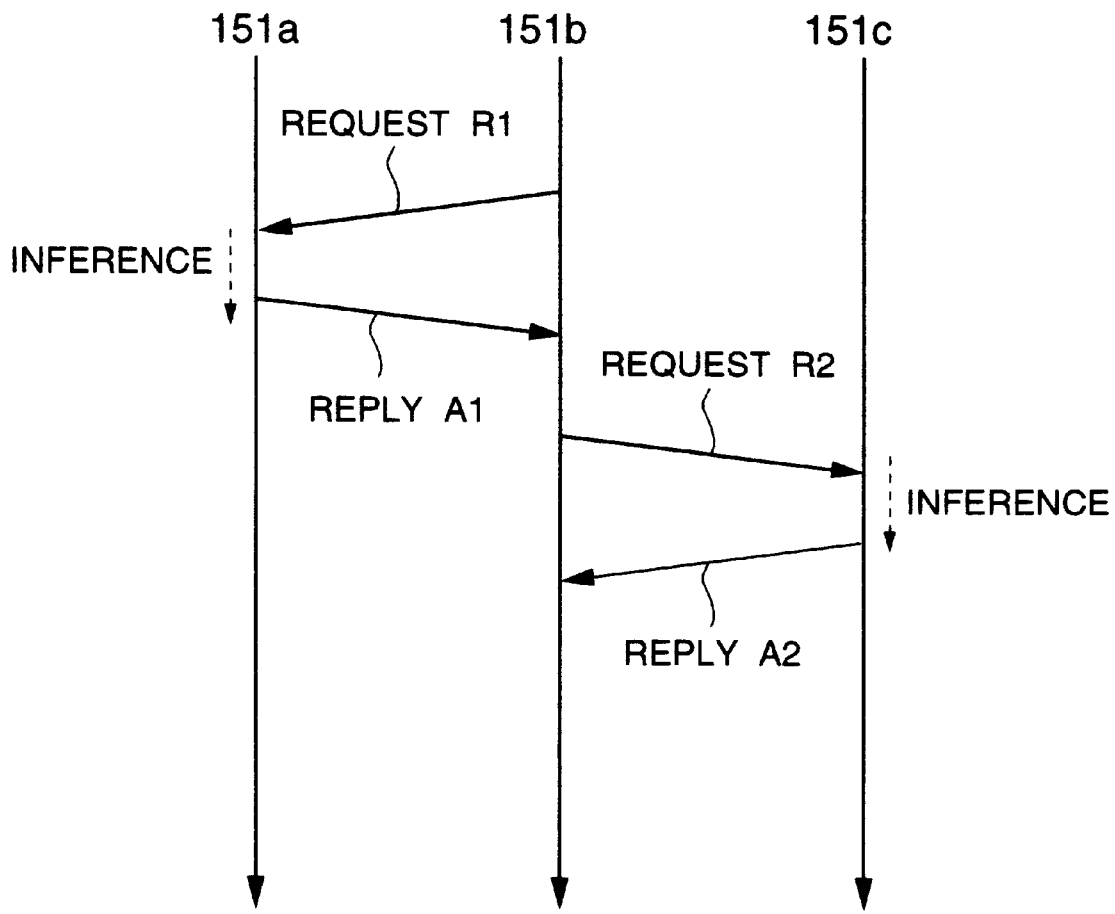
FIG. 21 is a schematic diagram for explaining a negotiating process between problem solving means according to an embodiment of the present invention.

FIG. 19 is a flow chart for explaining a process of the local problem solving means that is negotiating with another problem solving means. As shown in FIG. 19, when the local problem solving means has determined that it should negotiate with another problem solving means (at step 1901), it creates an operation time change request (at step 1902). Thereafter, the local problem solving means selects one of the other problem solving means as a negotiating party and sends the created operation time change request to the selected problem solving means (at step 1903).

The selected problem solving means determines whether or not to accept the received operation time change request (at step 1904). When the request can be accepted as the determined result of the selected problem solving means, it sends a reply message that represents the acceptance to the local problem solving means (at step 1905). When the request cannot be accepted as the determined result of the selected problem solving means, it sends a reply message that represents the rejection to the local problem solving means (at step 1905).

The local problem solving means receives the reply against the request (at step 1906) and determines whether or not it should negotiate with another problem solving means (at step 1901). The local problem solving means repeats the abovedescribed steps as long as it can do.

Next, with a real example, the above-described process will be described. In other words, in the schedule tables shown in FIG. 18, although the problem solving means 151*a* and 151*c* have assigned all the given jobs, the problem solving means 151*b* cannot assign the product A and the product B at the same time. The problem solving means 151*b* negotiates with another problem solving means so as to assign the jobs.

FIGS. 20A to 20C and 21 are schematic diagrams for explaining a negotiating process performed among each problem solving means. First of all, the problem solving means 151*b* sends an operation time change request to the problem solving means 151*a*. In reality, the strategy selecting portion 166 of the problem solving means 151*b* obtains negotiation strategies of which "role"=equal and "transaction"=tolerance from the strategy database 165 in the initial state and sends the obtained negotiation strategies to the inferring portion 162. Thus, the inferring portion 162 creates an operation change request that causes the job of the product B to be assigned to the time range from "7" to "10", the earliest start time of the job of the product A to be changed to "4", the tolerance of "1" to be added to the earliest start time of the job of the product A so that the earliest start time of the job of the product becomes "3". Thereafter, the inferring portion 162 sends the created operation time change request to the problem solving means 151*a* through the communicating portion 161 (at step Rl shown in FIG. 21).

The strategy selecting portion 166 of the problem solving means 151*a* obtains negotiation strategies of which "role"= equal and "transaction"=tolerance from the strategy database 165 in the initial state and sends the obtained negotiation strategies to the inferring unit 162. The inferring unit 162 infers whether or not the latest end time of the job of the product A can be assigned to "3". The problem solving means 151*a* determines that the latest end time of the job of the product A can be changed to "3" because the job of the product A has been assigned to the time range from "0" to "3". However, when the latest end time of the job of the product A is assigned to "3", the amount of work for "3" is assigned to the time range from the earliest start time "0" to the latest end time "3". Thus, there is no tolerance. Consequently, the problem solving means 151*a* sends a reply that represents the rejection against the request to the problem solving means 151*b* through the communicating portion 161 (see FIG. 20A and step A1 in FIG. 21).

Next, the problem solving means 151*b* sends an operation time change request to the problem solving means 151*c*. With the similar negotiation strategies, the problem solving means 151*b* creates an operation time change request that causes the job of the product A to be assigned to the time range from "5" to "8", the latest end time of the job of the product B to be changed to "11", and a tolerance of "1" to be added to the latest delay time so that the latest end time of the job of the product B becomes "12". The problem solving means 151*b* sends the created operation time change request to the problem solving means 151*c* (at step R2 in FIG. 21).

The problem solving means 151*c* has negotiation strategies of which "role"=equal and "transaction"=tolerance in the initial state. Thus, the problem solving means 151*c* infers whether or not the earliest start time of the job of the product B can be changed to "12" and a tolerance can be added thereto. The problem solving means 151*c* assigns the job (amount of work ="2") of the product B to the time range from "12" to "15" with a tolerance. Thus, since the problem solving means 151*c* accepts the request, the negotiation between the problem solving means 151*b* and the problem solving means 151*c* is effected (see FIG. 20B and step A2 in FIG. 21). Consequently, the jobs of the products A and B have been completely assigned (see FIG. 20C).

However, depending on a given scheduling problem, even with negotiation strategies of which "role"=equal and "transaction"=tolerance, a negotiation may not be well effected. In this case, it is necessary to change the existing negotiation strategies to more proper negotiation strategies.

Next, the case that the problem solving means 151a, 151b, and 151c that are in charge of a lathe, a milling machine, and a drilling machine solve production schedules of a product C and a product D will be described. In this example, it is assumed that scheduling information has been input to the ;problem solving means 151a, 151b, and 151c.

"Product C"

First step: Lathe

Amount of work: 3

Earliest start time: 0

Latest end time: 5

Second step: Milling machine

Amount of work: 3

Earliest start time: 5

Latest end time: 10

"Product D"

First step: Lathe

Amount of work: 6

Earliest start time: 0

Latest end time: 5

Second step: Milling machine

Amount of work: 2

Earliest start time: 5

Latest end time: 10

Third step: Drilling machine

Amount of work: 2

Earliest start time: 10

Latest end time: 15

The problem solving means 151a, 151b, and 151c secure required amounts of time (amounts of work) in the individual schedule tables corresponding to the scheduling information of the products C and D.

Figure 22:
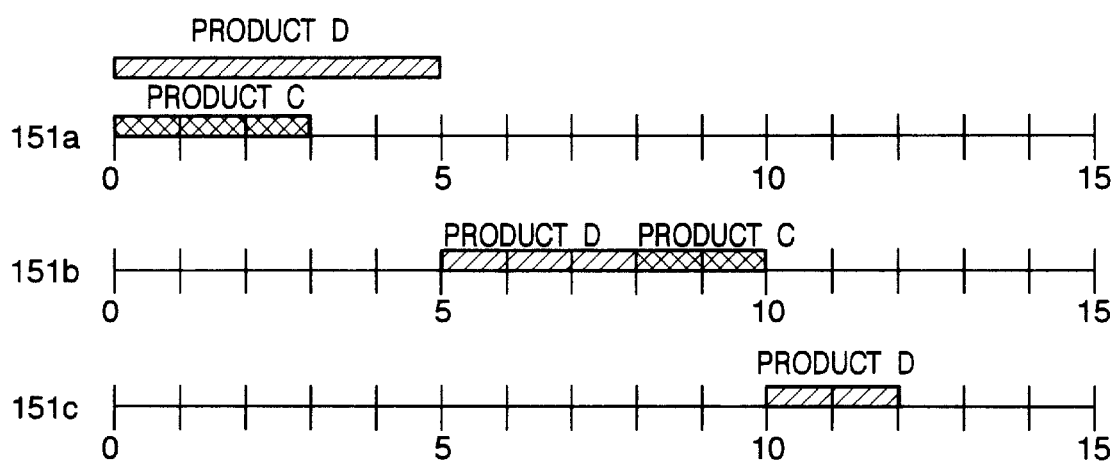
FIG. 22 is a schematic diagram showing an example of a schedule table according to an embodiment of the present invention.

FIG. 22 is a schematic diagram showing an example of schedule tables on which the inferring portions 162 of the program solving means 151a, 151b, and 151c have assigned given jobs. In FIG. 22, although the problem solving means 151b and the problem solving means 151c have assigned all the given jobs, the problem solving means 151a has not assigned the jobs of the products C and D. Thus, the problem solving means 151a negotiates with another problem solving means so as to assign these jobs.

Figure 23A:
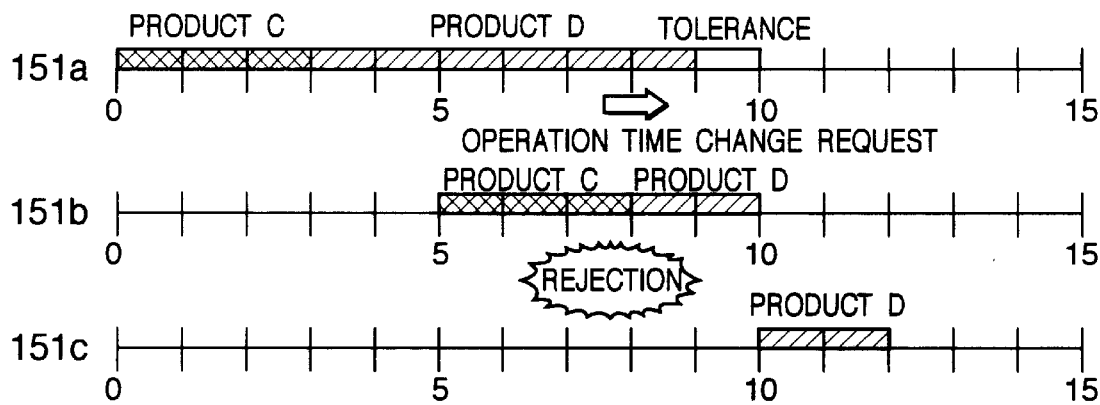
FIG. 23A is a schematic diagram showing a negotiating process between problem solving means according to an embodiment of the present invention.
Figure 23B:
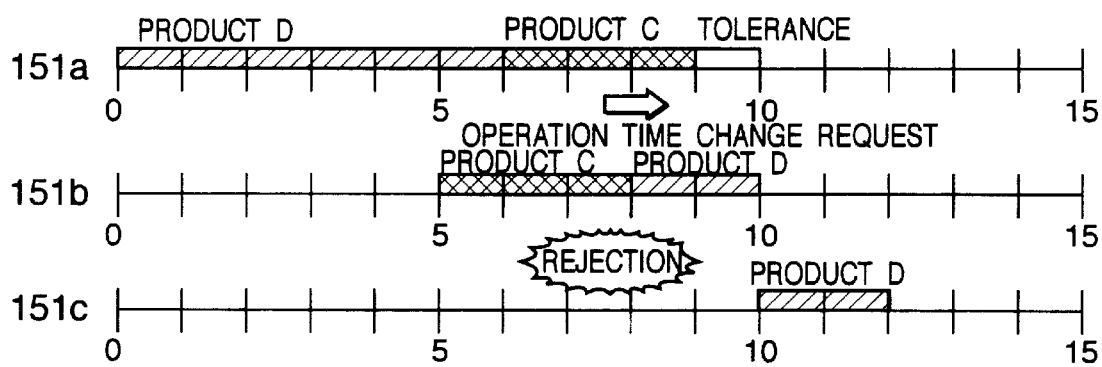
FIG. 23B is a schematic diagram showing a negotiating process between problem solving means according to an embodiment of the present invention.
Figure 23C:
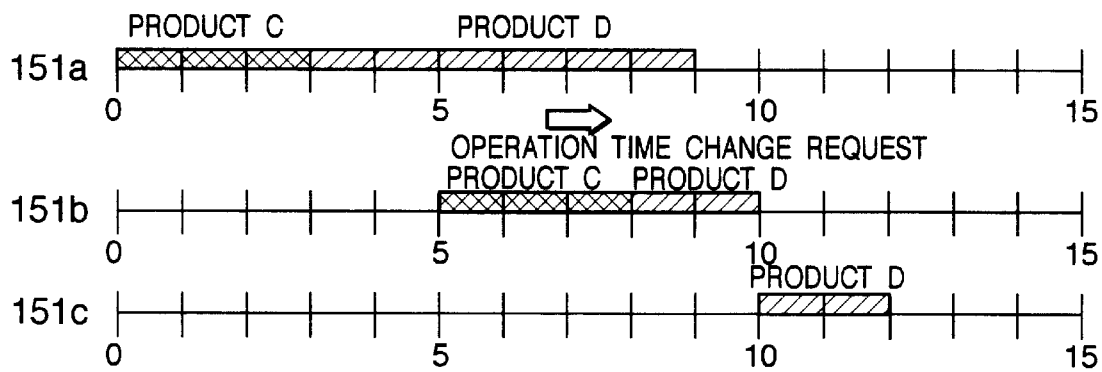
FIG. 23C is a schematic diagram showing a negotiating process between problem solving means according to an embodiment of the present invention.
Figure 23D:
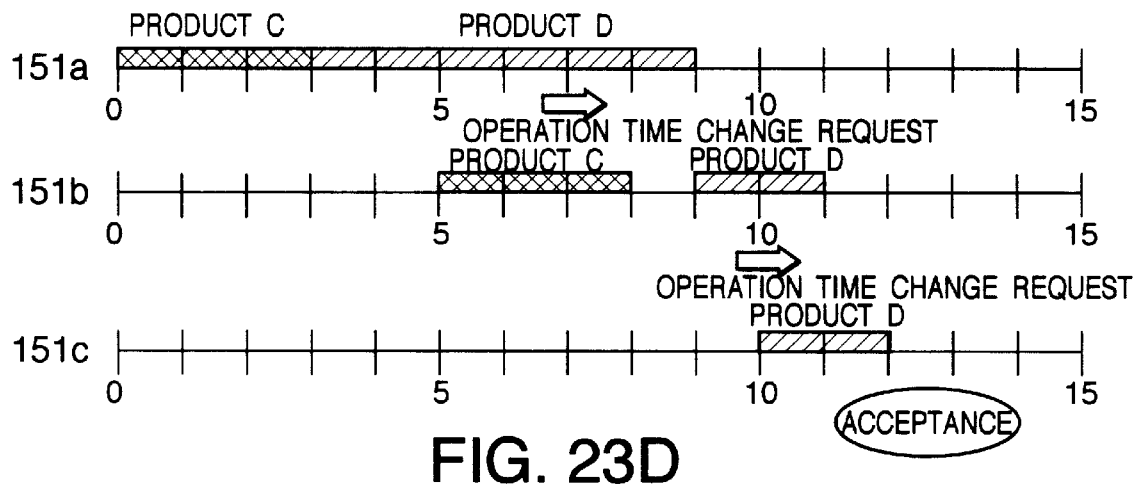
FIG. 23D is a schematic diagram showing a negotiating process between problem solving means according to an embodiment of the present invention.
Figure 23E:
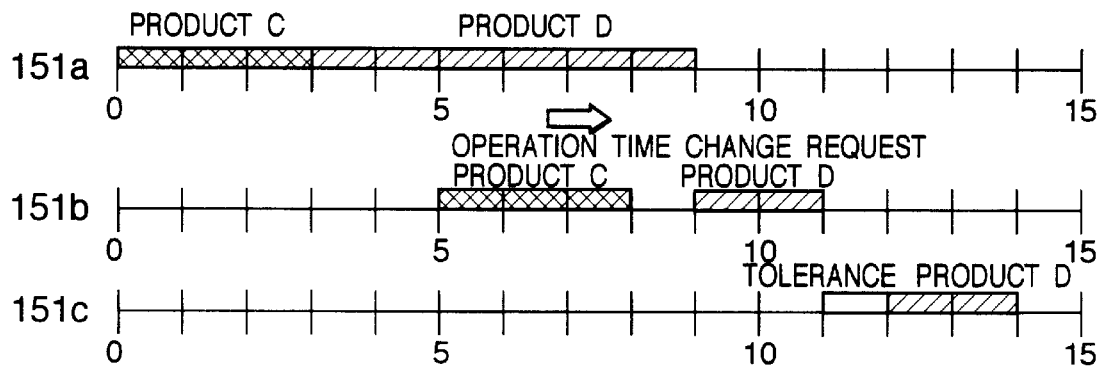
FIG. 23E is a schematic diagram showing a negotiating process between problem solving means according to an embodiment of the present invention.
Figure 24:
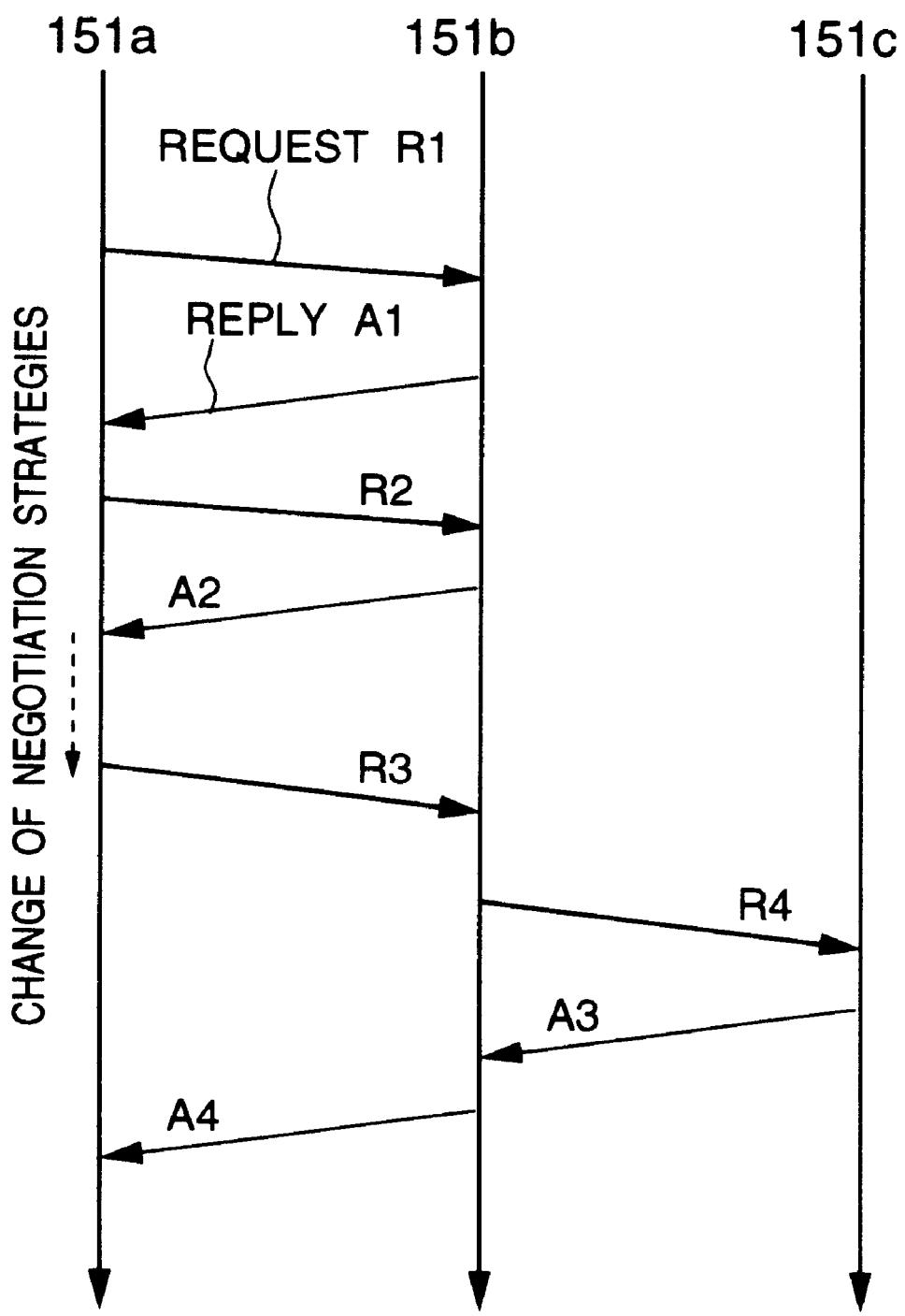
FIG. 24 is a schematic diagram showing a negotiating process between problem solving means according to an embodiment of the present invention.

FIGS. 23A, 23E, and 24 are schematic diagrams for explaining a negotiating process performed among each problem solving means. The problem solving means 151a sends an operation time change request to the problem solving means 151b (at step R1 in FIG. 24). In other words, the strategy selecting portion 166 of the problem solving means 151a obtains negotiation strategies of which "role"=equal and "transaction"=tolerance from the strategy database 165 in the initial state and sends the obtained negotiation strategies to the inferring portion 162. Thus, the inferring portion 162 creates an operation time change request that causes the job of the product C to be assigned to the time range from "0" to "3", the latest end time of the job of the product D to be changed to "9", and a tolerance of 1 to be added thereto so as to assign the latest end time of the job of the product D to "10". Thereafter, the inferring unit 162 sends the created operation time change request to the problem solving means 151b through the communicating portion 161.

The problem solving means 151b obtains negotiation strategies of which "role"=equal and "transaction"=tolerance from the strategy database 165 in the initial state and sends the obtained negotiation strategies to the inferring portion 162. The inferring portion 162 determines whether or not the earliest start time of the job of the product D can be assigned to "10" with a tolerance. Since the latest end time of the job of the product D has been assigned to "10", the problem solving means 151b determines that the earliest start time of the job of the product D cannot be assigned to "10". Thus, the problem solving means 151b sends a reply that represents the rejection against the request to the problem solving means 151a through the communicating portion 161 (see FIG. 23A and step A1 in FIG. 24).

Next, the problem solving means 151a sends an operation time change request to the problem solving means 151b (at step R2 in FIG. 24). In other words, with the same negotiation strategies, the problem solving means 151a sends an operation time change request that causes the job of the product D to be assigned to the time range from "0" to "6", the latest end time of the job of the product C to be changed to "9", and a tolerance of "1" to be added thereto so as to assign the latest end time of the job of the product C to "10". The problem solving means 151b has the similar negotiation strategies. Thus, the problem solving means 151b determines whether or not the earliest start time of the job of the product C can be assigned to "10" with a tolerance. Since the latest end time of the job of the product C has been assigned to "10", the problem solving means 151b determines that the earliest start time of the job of the product C cannot be assigned to "10". Thus, the problem solving means 151b sends a reply that represents the rejection against the request to the problem solving means 151a through the communicating portion 161 (see FIG. 23B and step A2 in FIG. 24).

When negotiation strategies are fixed as with the conventional negotiation models, at this point, the problem solving means 151a determines that the operation time cannot be changed and thereby the product C or D cannot be scheduled. However, the problem solving means 151a according to the present invention causes the strategy selecting portion 166 to change the existing negotiation strategies into more proper negotiation strategies.

In other words, the state storing portion 164 of the problem solving means 151a counts the number of the operation time change requests that have been rejected. The strategy selecting portion 166 of the problem solving means 151a receives such information from the state storing portion 164, obtains negotiation strategies of which "role"=upper and "transaction"=minimum as more proper negotiation strategies from the strategy database 165, and sends the obtained negotiation strategies to the inferring portion 162. In this condition, the problem solving means 151a sends an operation time change request to the problem solving means 151b. Thus, the problem solving means 151a creates an operation time change request that causes the job of the product C to be assigned to the time range from "0" to "3" and the least end time of the job of the product D to be changed to "9" as the minimum change. The problem solving means 151a sends the created operation time change request to the problem solving means 151b through the communicating portion 161 (at step R3 in FIG. 24).

The state storing portion 164 of the problem solving means 151b counts the number of operation time change requests that have been rejected. The strategy selecting portion 166 of the problem solving means 151b receives such information from the state storing portion 164, obtains negotiation strategies of which "role"=low and "transaction"=minimum from the strategy data base 165, and sends the obtained negotiation strategies to the inferring portion 162. The inferring portion 162 determines whether or not the earliest start time of the job of the product D can be assigned to "9". Since the latest end time of the job (amount of work="2") of the product D has been assigned to "10", the problem solving means 151b determines that the earliest start time of the job of the product D cannot be assigned to "9". Thus, the problem solving means 151b issues a new operation time change request so as to allow it to accept the original request. In other words, the problem solving means 151b creates an operation time change request that causes the latest end time of the job of the product D to be changed to "11" so as to assign the earliest start time of the job of the product D to "9" and sends the created operation time change request to the problem solving means 151c (at step R4 in FIG. 24).

The problem solving means 151c has negotiation strategies of which "role"=equal and "transaction"=tolerance in the initial state. Thus, the problem solving means 151c determines whether or not the earliest start time of the job of the product D can be assigned to "11" with a tolerance. The problem solving means 151c determines that the job (amount of work=2) of the product D can be assigned to the time range from "11" to "15" with a tolerance. Thus, the problem solving means 151c accepts the request and sends a reply that represents the acceptance against the request to the problem solving means 151b. Thus, a negotiation between the problem solving means 151b and the problem solving means 151c is effected (see FIG. 23D and step A3 in FIG. 24). In addition, the problem solving means 151b can accept the request received from the problem solving means 151a and sends a reply that represent the acceptance against the request to the problem solving means 151a. Thus, a negotiation between the problem solving means 151a and the problem solving means 151b is also effected (see FIG. 23E and step A4 in FIG. 24). Thus, the jobs of the products C and D have been completely assigned.

When the existing negotiation strategies are changed to more proper negotiation strategies corresponding to a give problem, a negotiation can be effected. As a result, the efficiency for solving a problem by the cooperative inferring apparatus can be improved.

It should be noted that the present invention is not limited to the above-described embodiments. In other words, the field and content of an inference problem, the number of problem solving means that cooperatively operate, the categorizing method of negotiation strategies to which the present invention is applied are not limited. For example, the present invention can be applied to a trouble diagnosis and a plant control. Five or more problem solving means may be provided. The negotiation strategies may be categorized from a view point of properties of the problem solving means.

As described above, according to the present invention, the negotiation strategies of each problem solving means are autonomously changed corresponding to the negotiation history, internal state, and external state. Thus, even if a given problem is complicated, proper negotiation strategies can be used. Consequently, a negotiation can be easily effected. As a result, the efficiency for solving a problem by the cooperative inferring apparatus can be improved.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A cooperative inferring apparatus linked to other cooperative inferring apparatus via a communication network, each cooperative inferring apparatus comprising:

an inferring part configured to infer a solution for a particular problem;

a proposal creating part configured to create a proposal for a negotiation with at least one of the other cooperative inferring apparatus when the inferring part requires a negotiated agreement with the at least one other cooperative inferring apparatus so as to infer a solution to the particular problem;

a communicating part configured to transmit the proposal to the at least one other cooperative inferring apparatus and to receive a reply from the at least one other cooperative inferring apparatus indicating whether the at least one other cooperative inferring apparatus will accept the proposal;

an agreement confirming part configured to transmit a message to the at least one other cooperative inferring apparatus requesting the at least one other cooperating inferring apparatus send an inferred state response indicating whether the at least one other cooperating inferring apparatus accepts or refuses an inferred state corresponding to the proposal as a settled inferred state and to receive the inferred state response from the at least one other cooperating inferring apparatus; and an informing part configured to inform the at least one other cooperative inferring apparatus that the inferred state is settled when the inferred state response indicates acceptance.

2. The apparatus as set forth in claim 1, wherein the proposal creating part, the communicating part, and the agreement confirming part perform a plurality of negotiations in parallel with plural other cooperative inferring apparatus.

3. The apparatus as set forth in claim 1, wherein the negotiation of the proposal with the at least one other cooperative inferring apparatus is performed corresponding to negotiation strategies that are assigned corresponding to the particular problem and that can be changed corresponding to a negotiation stage.

4. A cooperative inferring apparatus linked to other cooperative inferring apparatus via a communication network, said cooperative inferring apparatus comprising:

an inferring part configured to infer a solution for a particular problem;

a proposal creating part configured to create a proposal for a negotiation with at least one of the other cooperative inferring apparatus when the inferring part requires a negotiated agreement with the at least one other cooperative inferring apparatus so as to infer a solution to the particular problem;

a communicating part configured to transmit the proposal to the at least one other cooperative inferring apparatus and to receive a reply from the at least one other cooperative inferring apparatus indicating whether the at least one other cooperative inferring apparatus will accept the proposal; and an agreement confirming part configured to transmit a message to the at least one other cooperative inferring apparatus requesting the at least one other cooperating inferring apparatus send an inferred state response indicating whether the at least one other cooperating inferring apparatus accepts or refuses an inferred state corresponding to the proposal as a settled inferred state and to receive the inferred state response from the at least one other cooperating inferring apparatus, wherein the negotiation with the at least one other cooperative inferring apparatus is performed corresponding to negotiation strategies that are assigned corresponding to the particular problem and that can be changed corresponding to a negotiation stage and the negotiation strategies are affected by at least a negotiation history.

5. The apparatus as set forth in claim 4, wherein the negotiation history depends on the number of times negative information indicating that the at least one other cooperative inferring apparatus will not accept the proposal is obtained by said communicating part.

6. A cooperative inferring method for solving a particular problem in a system having a cooperative inferring apparatus linked to other cooperative inferring apparatus via a communication network, the method being performed at any of the cooperative inferring apparatus and comprising the steps of:

(a) attempting to infer a solution for the particular problem;

(b) creating a proposal for a negotiation with at least one of the other cooperative inferring apparatus when the step (a) cannot infer the solution to the particular problem without negotiating with the at least one other cooperative inferring apparatus;

(c) transmitting the proposal created by the step (b) to the at least one other cooperative inferring apparatus;

(d) receiving a reply from the at least one other cooperative inferring apparatus indicating whether the at least one other cooperative inferring apparatus will accept the proposal;

(e) transmitting a message to the at least one other cooperative inferring apparatus requesting the at least one other cooperative inferring apparatus send an inferred state response indicating whether the at least one other cooperative inferring apparatus accepts or refuses an inferred state corresponding to the proposal is a settled inferred state;

(f) receiving the inferred state response from the at least one other cooperative inferring apparatus; and informing the at least one other cooperative inferring apparatus that the inferring state is settled when the inferred state response indicates acceptance.

7. The method as set forth in claim 6, wherein the steps (b)–(f) are performed by performing a plurality of negotiations in parallel with plural other cooperative inferring apparatus.

8. A cooperative inferring method for solving a particular problem in a system having a cooperative inferring apparatus linked to other cooperative inferring apparatus via a communication network, the method being performed at any of the cooperative inferring apparatus and comprising the steps of:

(a) attempting to infer a solution for the particular problem;

(b) creating a proposal for a negotiation with at least one of the other cooperative inferring apparatus when the step (a) cannot infer the solution to the particular problem without negotiating with the at least one other cooperative inferring apparatus;

(c) transmitting the proposal created by the step (b) to the at least one other cooperative inferring apparatus;

(d) receiving a reply from the at least one other cooperative inferring apparatus indicating whether the at least one other cooperative inferring apparatus will accept the proposal;

(e) transmitting a message to the at least one other cooperative inferring apparatus requesting the at least one other cooperative inferring apparatus send an inferred state response indicating whether the at least one other cooperative inferring apparatus accepts or refuses an inferred state corresponding to the proposal as a settled inferred state; and (f) receiving the inferred state response from the at least one other cooperative inferring apparatus, wherein the negotiation of the proposal with the at least one other cooperative inferring apparatus is performed corresponding to negotiation strategies that are assigned corresponding to the particular problem and that can be changed corresponding to a negotiation stage.

9. The method as set forth in claim 8, wherein the negotiation strategies are affected by at least a negotiation history.

10. A record medium that holds a program that causes a computer to control each cooperative inferring apparatus linked to other cooperative inferring apparatus via a communication network, by performing the functions of:

(a) attempting to infer a solution for a particular problem;

(b) creating a proposal for a negotiation with at least one of the other cooperative inferring apparatus when the function (a) cannot infer the solution to the particular problem without negotiating with the at least one other cooperative inferring apparatus;

(c) transmitting the proposal created by the function (b) to the at least one other cooperative inferring apparatus;

(d) receiving a reply from the at least one other cooperative inferring apparatus indicating whether the at least one other cooperative inferring apparatus will accept the proposal;

(e) transmitting a message to the at least one other cooperative inferring apparatus requesting the at least one other cooperative inferring apparatus send an inferred state response indicating whether the at least one other cooperative inferring apparatus accepts or refuses an inferred state corresponding to the proposal is a settled inferred state;

(f) receiving the inferred state response from the at least one other cooperative inferring apparatus; and (g) informing the at least one other cooperative inferring apparatus that the inferring state is settled when the inferred state response indicates acceptance.

11. The medium as set forth in claim 10, wherein the functions (b)–(f) are performed by performing a plurality of parallel negotiations with plural other cooperative inferring apparatus.

12. A cooperative inferring system having a cooperative inferring unit for solving a particular problem and at least one other cooperative inferring unit for helping the cooperative inferring unit solve the particular problem, the cooperative inferring unit and the at least one other cooperative inferring unit being linked with each other via communication network, wherein each of the cooperative inferring units comprises:

an inferring part configured to infer a solution for the particular problem;

a proposal creating part configured to create a proposal for a negotiation with the at least one other cooperative inferring apparatus when the inferring part requires a negotiated agreement with the at least one other cooperative inferring apparatus so as to infer a solution to the particular problem;

a communicating part configured to transmit the proposal to the at least one other cooperative inferring apparatus and to receive a reply from the at least one other cooperative inferring apparatus indicating whether the at least one other cooperative inferring apparatus will accept the proposal;

an agreement confirming part configured to transmit a message to the at least one other cooperative inferring apparatus requesting the at least one other cooperating inferring apparatus send an inferred state response indicating whether the at least one other cooperating inferring apparatus accepts or refuses an inferred state corresponding to the proposal as a settled inferred state and to receive the inferred state response from the at least one other cooperating inferring apparatus; and an informing part configured to inform the at least one other cooperative inferring unit that the inferred state is settled when the inferred state response indicates acceptance.

13. The system as set forth in claim 12, wherein the at least one other cooperative inferring unit has:
   a proposal determining part configured to determine whether the proposal received by the communicating part is acceptable or not;
   a reply sending part configured to send the reply determined by the proposal determining part; and
   a response sending part configured to send the response for the message requested by the agreement confirming part.

14. The system as set forth in claim 12, wherein the proposal creating part, the communicating part, and the agreement confirming part perform a plurality of said negotiations in parallel with plural other cooperative inferring apparatus.

15. The system as set forth in claims 12, wherein said proposal creating part and said communicating part are categorized as:
   a first module included in a first layer that defines a unique process for each of the cooperative inferring units;
   a second module included in a second layer that defines a process for each problem; and
   a third module included in a third layer that defines a common process between each cooperative inferring unit.

16. A cooperative inferring system having a cooperative inferring unit for solving a particular problem and at least one other cooperative inferring unit for helping the cooperative inferring unit solve the particular problem, each cooperative inferring unit being linked together via a communication network, wherein each cooperative inferring unit comprises:
   an inferring part configured to infer a solution for the particular problem;
   a proposal creating part configured to create a proposal for a negotiation with at least one of the other cooperative inferring apparatus when the inferring part requires a negotiated agreement with the at least one other cooperative inferring apparatus so as to infer a solution to the particular problem;
   a communicating part configured to transmit the proposal to the at least one other cooperative inferring unit and to receive a reply from the at least one other cooperative inferring unit indicating whether the at least one other cooperative inferring unit will accept the proposal; and
   an agreement confirming part configured to transmit a message to the at least one other cooperative inferring unit requesting the at least one other cooperative inferring unit send an inferred state response indicating whether the at least one other cooperative inferring unit accepts or refuses an inferring state corresponding to the proposal as a settled inferred state and to receive the inferred state response from the at least one other cooperative inferring unit, wherein the negotiation with the at least one other cooperative inferring unit is performed corresponding to negotiation strategies that are assigned corresponding to the particular problem and that can be changed corresponding to a negotiation stage and the negotiation strategies are affected by at least a negotiation history and the negotiation history depends on the number of times negative information indicating that the at least one other cooperating inferring unit will not accept the proposal is obtained by said communicating part.

17. A record medium that records a program that causes a computer to perform the following functions for each cooperative cooperative inferring apparatus linked together via a communication network:

(a) attempting to infer a solution for solving a particular problem;

(b) creating a proposal for a negotiation with at least one other cooperative cooperative inferring apparatus when the function (a) cannot infer the solution without negotiating with the at least one other cooperative cooperative inferring apparatus;

(c) transmitting the proposal created by the function (b) to the at least one other cooperative inferring apparatus;

(d) receiving a reply from the at least one other cooperative inferring apparatus indicating whether the at least one other cooperative inferring apparatus will accept or refuse the proposal;

(e) transmitting a message to the at least one other cooperative inferring apparatus requesting the at least one other cooperative inferring apparatus send an inferred state response indicating whether an inferred state corresponding to the proposal is a settled inferred state; and (f) receiving the response from the at least one other cooperative inferring apparatus, wherein the negotiation with the at least one other cooperative inferring apparatus is performed corresponding to negotiation strategies that are assigned corresponding to the particular problem and that can be changed corresponding to a negotiation stage, the negotiation strategies are affected by at least a negotiation history, and the negotiation history depends on the number of times of negative information indicating that the at least one other cooperating inferring unit will not accept the proposal is obtained by said communicating part.

* * * * *

UNITED STATES PATENT AND TRADEMARK OFFICE
CERTIFICATE OF CORRECTION

PATENT NO. : 6,182,055 B1
DATED : January 30, 2001
INVENTOR(S) : Naoki Kase et al.

It is certified that error appears in the above-identified patent and that said Letters Patent is hereby corrected as shown below:

Column 2,
Line 36, after "is" delete "of."

Column 9,
Line 49, before "Each" delete "1t."

Column 12,
Line 27, change "allows" to -- allow --.

Column 15,
Line 58, change "send" to -- sends --.

Column 19,
Line 52, change "anther" to -- another --.

Column 23,
Line 61, change "These" to -- The --.

Column 26,
Line 33, change "have" to -- has --;
Line 65, change "the" to -- that --.

Column 28,
Line 14, change "parity" to -- party --.

Column 31,
Line 11, delete ";" before "problem solving".

Column 34,
Line 23, insert -- or refuse -- after "accept";
Line 40, insert -- for solving the particular problem -- after "negotiations";
Line 64, insert -- or refuse -- after "accept".

Column 35,
Line 49, change "inferring" to -- inferred --;
Line 53, insert -- for solving the particular problem -- before "negotiations".

UNITED STATES PATENT AND TRADEMARK OFFICE
CERTIFICATE OF CORRECTION

PATENT NO.   : 6,182,055 B1
DATED        : January 30, 2001
INVENTOR(S)  : Naoki Kase et al.

It is certified that error appears in the above-identified patent and that said Letters Patent is hereby corrected as shown below:

Column 36,
Line 52, change "inferring" to -- inferred --;
Line 56, insert -- for solving the particular problem -- after "negotiations".

Column 37,
Line 12, insert -- or refuse -- after "accept";
Line 41, insert -- for solving the particular problem -- after "negotiations".

Column 38,
Line 7, insert -- or refuse -- after "accept".

Signed and Sealed this

Twelfth Day of August, 2003

JAMES E. ROGAN
*Director of the United States Patent and Trademark Office*